US010831660B1

(12) United States Patent
Williams et al.

(10) Patent No.: US 10,831,660 B1
(45) Date of Patent: Nov. 10, 2020

(54) ORDERING EXECUTION OF AN INTERRUPT HANDLER

(71) Applicant: INTERNATIONAL BUSINESS MACHINES CORPORATION, Armonk, NY (US)

(72) Inventors: Derek E. Williams, Round Rock, TX (US); Guy L. Guthrie, Austin, TX (US); Hugh Shen, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/455,340

(22) Filed: Jun. 27, 2019

(51) Int. Cl.
| | |
|---|---|
| *G06F 12/0811* | (2016.01) |
| *G06F 12/0897* | (2016.01) |
| *G06F 12/12* | (2016.01) |
| *G06F 9/38* | (2018.01) |
| *G06F 9/48* | (2006.01) |
| *G06F 9/52* | (2006.01) |
| *G06F 12/084* | (2016.01) |

(52) U.S. Cl.
CPC ........ *G06F 12/0811* (2013.01); *G06F 9/3816* (2013.01); *G06F 9/4812* (2013.01); *G06F 9/522* (2013.01); *G06F 12/084* (2013.01); *G06F 12/0897* (2013.01); *G06F 12/12* (2013.01)

(58) Field of Classification Search
CPC .............................. G06F 12/0811; G06F 9/522
USPC ......................................................... 711/122
See application file for complete search history.

(56) References Cited

U.S. PATENT DOCUMENTS

| | | | |
|---|---|---|---|
| 5,317,720 A | 5/1994 | Stamm et al. | |
| 5,559,987 A * | 9/1996 | Foley ................. | G06F 12/0831 711/140 |
| 5,822,578 A | 10/1998 | Frank et al. | |
| 5,900,020 A | 5/1999 | Safranek et al. | |
| 5,924,118 A * | 7/1999 | Arimilli ............. | G06F 12/0833 711/130 |
| 7,065,614 B1 | 6/2006 | Vartti et al. | |
| 7,890,700 B2 | 2/2011 | Choy et al. | |
| 8,099,559 B2 | 1/2012 | Choudhury et al. | |
| 9,507,647 B2 | 11/2016 | Blumrich et al. | |
| 2005/0005073 A1 | 1/2005 | Pruvost et al. | |

(Continued)

OTHER PUBLICATIONS

IBM, Power ISA—Version 3.0 B, pp. 1-1258, Mar. 29, 2017.

*Primary Examiner* — Jae U Yu
(74) *Attorney, Agent, or Firm* — Brian F. Russell; David Quinn

(57) ABSTRACT

A processing unit for a multiprocessor data processing system includes a processor core having an upper level cache and a lower level cache coupled to the processor core. The lower level cache includes one or more state machines for handling requests snooped from the system interconnect. The processing unit includes an interrupt unit configured to, based on receipt of an interrupt request while the processor core is in a powered up state, record which of the one or more state machines are active processing a prior snooped request that can invalidate a cache line in the upper level cache and present an interrupt to the processor core based on determining that each state machine that was active processing a prior snooped request that can invalidate a cache line in the upper level cache has completed processing of its respective prior snooped request.

18 Claims, 17 Drawing Sheets

(56) References Cited

U.S. PATENT DOCUMENTS

2006/0179247 A1* 8/2006 Fields, Jr. ............ G06F 12/0831
 711/141
2009/0182954 A1 7/2009 Mejdrich et al.

* cited by examiner

900 →
ST FLAG, VALUE —902
SYNC —904
MSG_SEND rA —906
FIG. 9
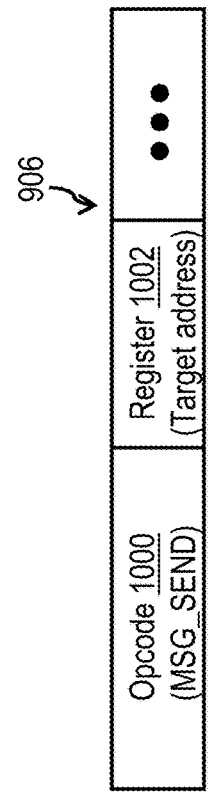
FIG. 10
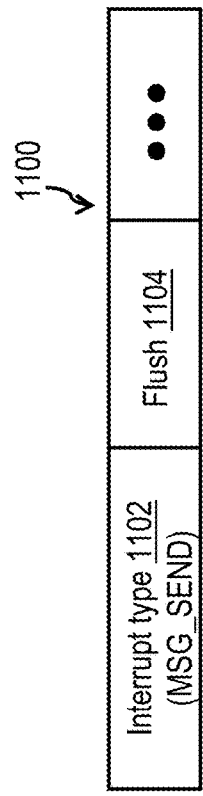
FIG. 11

ORDERING EXECUTION OF AN INTERRUPT HANDLER

BACKGROUND OF THE INVENTION

The present invention relates in general to data processing system and, in particular, to managing accesses to data in shared memory of a data processing system. Still more particularly, the present invention relates to a processor, data processing system and method for synchronizing accesses to data in a shared memory.

In shared memory multiprocessor (MP) data processing systems, each of the multiple concurrently executing hardware threads of execution in the system may access and modify data stored in the shared memory. Shared memory MP data processing systems implement a spectrum of memory consistency models that define the ordering, if any, to be observed between the load and store accesses of the various hardware threads. Memory consistency models are typically described as ranging between more strongly ordered memory consistency models that require load and store accesses to be performed in an ordering more-or-less closely corresponding to program ordering of the instructions initiating the memory accesses to weakly ordered memory consistency models that allow more flexibility in the ordering of memory accesses in order to promote greater resource utilization and throughput.

Shared memory MP data processing systems employing weakly ordered memory consistency models commonly allow a programmer to enforce a desired ordering and atomicity of memory access operations not provided automatically by the memory consistency model through use of explicit "synchronization" or "barrier" instructions. A barrier instruction forces various load and store instructions preceding and following the barrier instruction in a given hardware thread of execution to be performed in program order (in-order) relative to the barrier instruction (and subsequent memory accesses) and to possibly restore the atomicity of stores (depending on barrier type) under certain circumstances. As barriers flow through the system, barriers may also be utilized to enforce certain types of inter-thread memory access ordering. Barrier performance is generally a critical component of the overall performance of weak memory consistency model machines and, as such, it is desirable to ensure that the ordering indicated by the barriers be enforced in an efficient manner.

BRIEF SUMMARY

According to at least one embodiment, a multiprocessor data processing system is configured to efficiently enforce ordering of a storage-modifying operation preceding a barrier with respect to execution of an interrupt handler invoked by a messaging instruction following the barrier at a processing unit receiving an interrupt.

In at least one embodiment, a processing unit for the multiprocessor data processing system includes a processor core having an upper level cache and a lower level cache coupled to the processor core. The lower level cache includes one or more state machines for handling requests snooped from the system interconnect. The processing unit includes an interrupt unit configured to, based on receipt of an interrupt request while the processor core is in a powered up state, record which of the one or more state machines are active processing a prior snooped request that can invalidate a cache line in the upper level cache and present an interrupt to the processor core based on determining that each state machine that was active processing a prior snooped request that can invalidate a cache line in the upper level cache has completed processing of its respective prior snooped request.

BRIEF DESCRIPTION OF THE SEVERAL VIEWS OF THE DRAWINGS

FIG. 9 is an exemplary interrupt instruction sequence including a barrier instruction that orders a preceding store instruction with respect to a subsequent interrupt instruction in accordance with one embodiment;

FIG. 10 is an exemplary MSG_SEND instruction in accordance with one embodiment;

FIG. 11 is an exemplary MSG_SEND interrupt in accordance with one embodiment;

DETAILED DESCRIPTION

Figure 1:
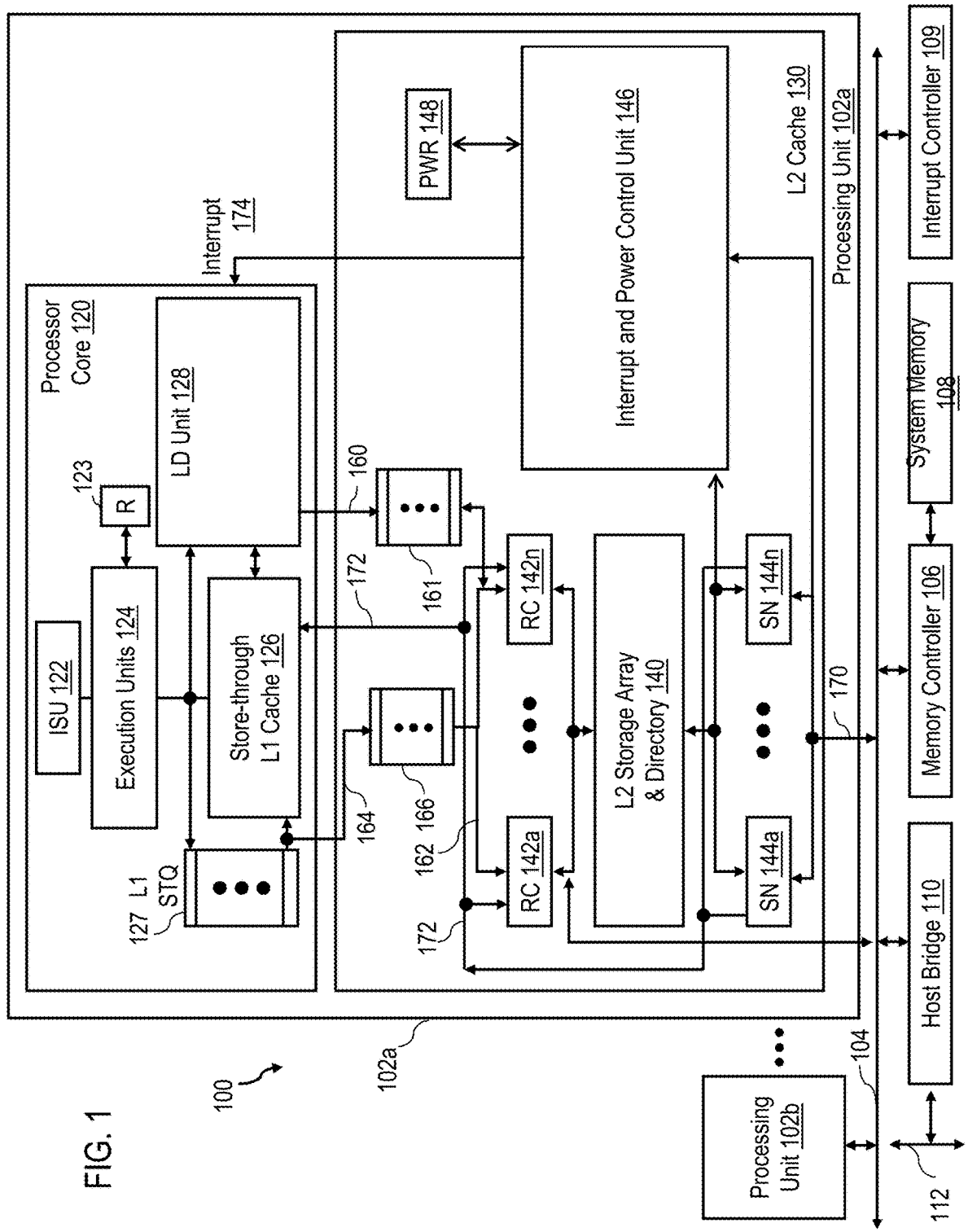
FIG. 1 is a high-level block diagram of an illustrative data processing system in accordance with one embodiment.

With reference now to the figures and in particular with reference to FIG. 1, there is illustrated a high-level block diagram of a data processing system 100 in accordance with one embodiment. As shown, data processing system 100 includes multiple processing units 102 (including at least processing units 102a-102b) for processing data and instructions. Processing units 102 are coupled for communication to a system interconnect 104 for conveying address, data, coherency, and control information between attached devices. In the depicted embodiment, these attached devices include not only processing units 102, but also a memory controller 106 providing an interface to a shared system memory 108 and one or more host bridges 110, each providing an interface to a respective mezzanine bus 112. Mezzanine bus 112 in turn provides slots for the attachment of additional unillustrated devices, which may include network interface cards, I/O adapters, non-volatile memory, non-volatile storage device adapters, additional bus bridges, etc.

As further illustrated in FIG. 1, each processing unit 102, which may be realized as a single integrated circuit, includes one or more processor cores 120 (of which only one is explicitly shown) for processing instructions and data. Each processor core 120 includes an instruction sequencing unit (ISU) 122 for fetching and ordering instructions for execution, one or more execution units 124 for executing instructions dispatched from ISU 122, and a set of registers 123 for temporarily buffering data and control information. The instructions executed by execution units 124 include load and store instructions that access shared memory, as well as synchronization (barrier) instructions utilized to order access to shared memory between a particular thread of execution and other concurrent threads of execution. In at least some embodiments, the instructions executed by execution units 124 further include messaging instructions that cause interrupts to be generated, as discussed in greater detail below with reference to FIG. 9. ISU 122 and execution units 124 are preferably configured to support execution of instructions out-of-order with respect to the programmed order of the instructions in order to provide improved throughput and resource utilization.

Each processor core 120 further includes an L1 store queue (STQ) 127 and a load unit 128 for managing the completion of store and load requests, respectively, corresponding to executed store and load instructions. In a preferred embodiment, L1 STQ 127 is implemented as an ordered queue containing a plurality of queue entries for buffering store and barrier requests, as discussed in greater detail below.

It is important to note that the present application makes a distinction between "instructions", such as load and store instructions, and "requests." Load and store "instructions" are defined herein as inputs to an execution unit that include an request code (opcode) identifying the type of instruction and one or more operands specifying data to be accessed and/or its address. Load and store "requests" are defined herein as data and/or signals generated following instruction execution that specify at least the target address of data to be accessed. Thus, load and store requests may be transmitted from a processor core 120 to the shared memory system to initiate data accesses, while load and store instructions are not.

The operation of processor core 120 is supported by a multi-level volatile memory hierarchy having, at its lowest level, shared system memory 108, and at its upper levels two or more levels of cache memory, which in the illustrative embodiment include a L1 cache 126 and a L2 cache 130. As in other shared memory multiprocessor data processing systems, the contents of the memory hierarchy may generally be accessed and modified by threads of execution executing in any processor core 120 in any processing unit 102 of data processing system 100.

In accordance with at least one embodiment, L1 cache 126, which may include bifurcated L1 data and instruction caches, is implemented as a store-through cache, meaning that the point of cache coherency with respect to other processor cores 120 is located below L1 cache 126 and, in the depicted embodiment, is located at store-in L2 cache 130. Accordingly, L1 cache 126 does not maintain true cache coherency states (e.g., Modified, Exclusive, Shared, Invalid) for its cache lines, but only maintains valid/invalid bits. Because L1 cache 126 is implemented as a store-through cache, store requests may first complete relative to the associated processor core 120 in L1 cache 126 and then complete relative to the L2 caches 130 of the various processing units 102 at different points in time.

As further illustrated in FIG. 1, L2 cache 130 contains a storage array and directory 140 that store cache lines of instructions and data in association with their respective memory addresses and coherence states. L2 cache 130 also includes a number of read-claim (RC) state machines 142a-142n for independently and concurrently servicing memory access requests received from the associated processor cores 120. RC machines 142 receive core load requests from LD unit 128 in processor core 120 via load bus 160, a L2 load queue (LDQ) 161, and command bus 162. Similarly, RC machines 142 receive core store requests from L1 STQ 127 in processor core 120 via store bus 164, a L2 store queue (STQ) 166, and command bus 162.

L2 cache 130 further includes a number of snoop (SN) state machines 144a-144n for servicing memory access and other requests received from other processing units 102 via system interconnect 104 and snoop bus 170. SN machines 144 and RC machines 142 are each connected to a back-invalidation bus 172 by which any SN machine 144 or RC machine 142 can signal the invalidation of a cache line in L1 cache 126 to processor core 120.

It is important to note that in a preferred embodiment L2 cache 130 is constructed such that, generally, at most a single one of RC machines 142 and SN machines 144 in a given processing unit 102 can be active servicing a request targeting a given target cache line address at any one time. Consequently, if a second request is received while a first request targeting the same cache line is already being serviced by an active RC machine 142 or active SN machine 144, the later-in-time second request must be queued or rejected until servicing of the first request is completed and the active state machine returns to an idle state.

Processing unit 102 finally includes an interrupt and power control unit (IPCU) 146. IPCU 146 is coupled to a power supply 148 and, while IPCU 146 itself is powered on as long as power is provided by power supply 148, IPCU 146 is preferably configured to selectively power-up or power-down the remainder of processing unit 102 in order to provide a reduction in power dissipation and heat and promote efficient resource utilization. IPCU 146 may power-up or power-down processor core(s) 120 or L2 caches 130, for example, in response commands of a software control program (e.g., hypervisor). IPCU 146 also communicates interrupts to processor core 120 via interrupt bus 174 based on interrupt requests received (snooped) via system interconnect 104 from an interrupt controller 109, as discussed further below.

Those skilled in the art will additionally appreciate that data processing system 100 of FIG. 1 can include many additional non-illustrated components, such as interconnect bridges, non-volatile storage, ports for connection to networks or attached devices, etc. Because such additional components are not necessary for an understanding of the described embodiments, they are not illustrated in FIG. 1 or discussed further herein. It should also be understood, however, that the enhancements described herein are applicable to cache coherent data processing systems of diverse architectures and are in no way limited to the generalized data processing system architecture illustrated in FIG. 1.

Multiprocessor data processing systems such as data processing system 100 of FIG. 1 implement a memory consistency model that specifies the legal possible executions of a given multiprocessor program with respect to memory accesses (e.g., among other things, the values that may be returned by load instructions, the order of writes to memory, those instruction execution dependencies that affect the ordering of memory accesses, and the final values for memory locations at the conclusion of a multiprocessor program). A memory consistency model is specified by two major characteristics: ordering of memory access requests and atomicity of store requests.

The ordering of memory requests specifies how memory requests may, if at all, be re-ordered relative to the order of their respective load and store instructions in the individual threads of execution in the multiprocessor program. Memory consistency models must define ordering of memory access requests in four general cases: (1) ordering of the memory requests for a load instruction to a following load instruction, (2) ordering of the memory requests for a load instruction to a following store instruction, (3) ordering of the memory requests for a store instruction to a following store instruction, and (4) ordering of the memory requests for a store instruction to a following load instruction. Strong consistency memory models will, in general, preserve all or at least most of these orderings. In particular, many strong consistency memory models enforce the first three orderings, but do not enforce store-to-load ordering. Weak consistency memory models will generally not enforce most or all of these orderings.

Atomicity of store requests refers to whether or not a given thread of execution can read the value of its own store request before other threads, and furthermore, whether the value written to the distributed shared memory system by the store request becomes visible to other threads in a logically instantaneous fashion or whether the value can become visible to other threads at different points in time. A memory consistency model is called "multi-copy atomic" if the value written by a store request of one thread becomes visible to all other threads in a logically instantaneous fashion. In general, strong consistency memory models are multi-copy atomic, and weak consistency memory models do not enforce multi-copy atomicity.

In a given multiprocessor program, program semantics often require that multi-copy atomicity and/or the various orderings between memory access requests are respected. Therefore, in an exemplary embodiment of data processing system 100, in which the distributed shared memory system implements a weak consistency memory model, so called "barrier" (e.g., SYNC) instructions are typically provided to allow the programmer to specify what memory access request orderings and atomicity are to be applied during execution of the multiprocessor program. In particular, a barrier instruction causes the distributed shared memory system to perform a relevant set of memory accesses initiated by instructions preceding the barrier instruction (e.g., depending on the type of barrier, store accesses only or both load and store accesses) prior to memory accesses initiated by instructions following the barrier instruction.

Figure 2:
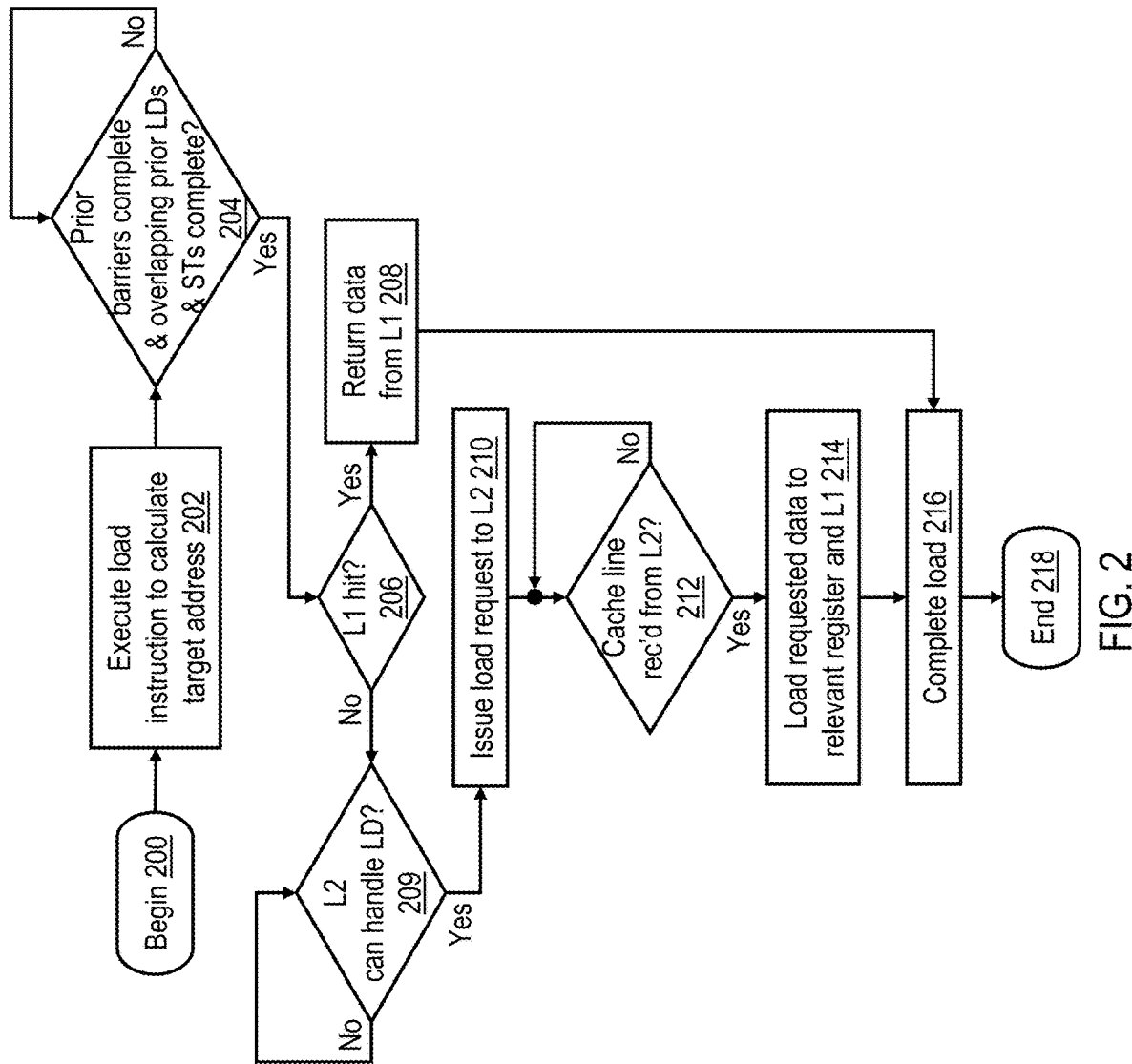
FIG. 2 is a high-level logical flowchart of an exemplary method of processing a load instruction in a processor core in accordance with one embodiment.

Referring now to FIG. 2, there is depicted a high-level logical flowchart of an exemplary method by which a processor core 120 of data processing system 100 processes a load instruction in accordance with one embodiment. As shown, the process begins at block 200 and thereafter proceeds to block 202, which illustrates execution units 124 receiving a load instruction from ISU 122 and then executing the load instruction to calculate a load target address. Following execution of the load instruction, an indication of the instruction type, a thread identifier, a register identifier, and the load target address calculated by execution of the load instruction are received from execution units 124 by LD unit 128. At block 204, LD unit 128 enforces ordering for the load instruction by waiting for the completion of any relevant prior barrier requests (see, e.g., FIG. 6, blocks 612 and 630), as well as the completion of any prior overlapping load request or store request targeting the same memory locations as the load instruction executed at block 202. As discussed below with reference to block 216 of FIG. 2 and block 412 of FIG. 4, a load request is considered complete when the data requested by the load request is returned to the relevant register 123 in processor core 120, and a store request is considered complete when the store request is placed in L1 STQ 127. Once LD unit 128 enforces any necessary ordering for the load instruction at block 204, the process passes to block 206.

At block 206, LD unit 128 determines whether or not the load target address of the load instruction resides in L1 cache 126 (i.e., the load target address "hit" in L1 cache 126). If so, LD unit 128 returns the data corresponding to the load target address from L1 cache 126 to the appropriate core register 123 (block 208). Thereafter, LD unit 128 completes the load request (block 216), and the process ends at block 218. Returning to block 206, in response to determining that the load target address of the load instruction missed in L1 cache 126, LD unit 128 determines if L2 cache 130 can presently handle the load request (block 209) and, if so, issues a load request to L2 cache 130 via load bus 160 (block 210). The load request includes, for example, an indication of the request type, the load target address, and an identifier of the issuing thread. After buffering the load request in L2 LDQ 161, L2 cache 130 dispatches the load request to an RC machine 142 for servicing, as described further below with reference to FIG. 3.

Next, at block 212, LD unit 128 awaits return from L2 cache 130 of the requested cache line identified by the load target address. In response to receipt of the requested cache line, LD unit 128 loads the requested cache line into L1 cache 126 and transfers the data word(s) associated with the load target address into the appropriate core register 123 (block 214). Following block 214, the process of FIG. 2 passes to block 216 and 218, which have been described.

Figure 3:
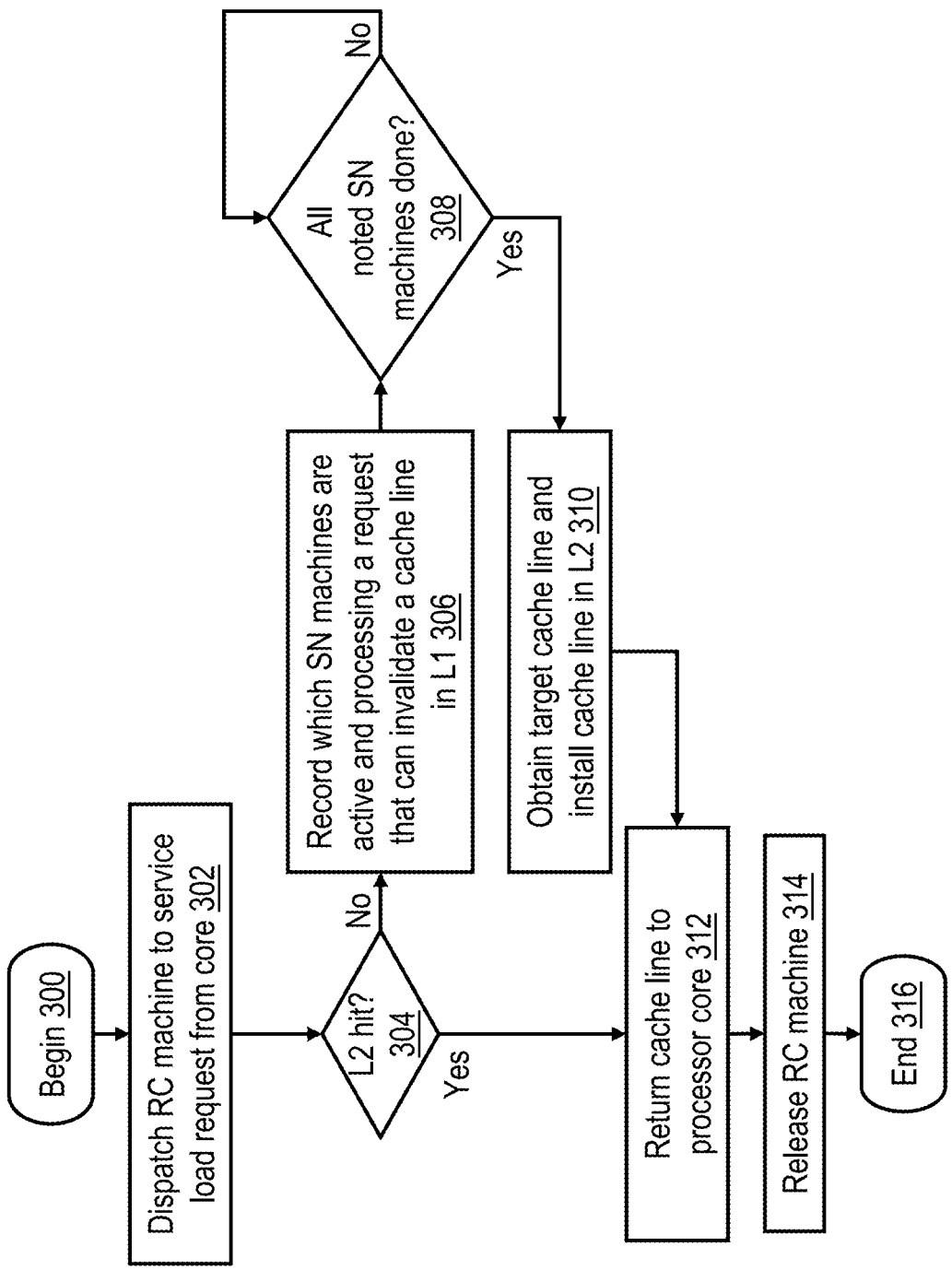
FIG. 3 is a high-level logical flowchart of an exemplary method of processing a load request in a lower level cache in accordance with one embodiment.

Referring now to FIG. 3, there is depicted a high-level logical flowchart of an exemplary method by which an L2 cache 130 of data processing system 100 processes a load request in accordance with one embodiment. The process begins at block 300 and then proceeds to block 302, which depicts L2 cache 130 dispatching an RC machine 142 to service a next load request of the associated processor core 120 that is enqueued in L2 LDQ 161. At block 304, RC machine 142 determines whether or not the load target address of the load request hit in L2 storage array and directory 140. If so, the process passes directly to block 312, which is described below. If not, RC machine 142 records which, if any, of the local SN machines 144 are active and processing a snooped request that requires issuance of a back invalidation message to L1 cache 126 (block 306).

Block 308 illustrates the RC machine 142 dispatched to service the load request then waiting for all of the SN machines 144 (if any) recorded at block 306 to complete processing of their respective snooped requests, thus ensuring any invalidations in L1 cache 126 entailed by the older snooped requests are appropriately ordered prior to servicing of the load request (block 308). As discussed below with reference to block 712 of FIG. 7, this ordering is enforced because, in data processing system 100, completion of barriers does not require the invalidating effects of store requests to be applied to the L1 caches 126 in all processor cores 120.

Following block 308, the process passes to block 310, which illustrates the RC machine 142 issuing one or more requests on system interconnect 104 in order to obtain a copy of the requested cache line from another cache hierarchy or system memory 108. In response to obtaining the requested cache line, RC machine 142 installs the requested cache line into L2 storage array and directory 140. The process then passes from block 310 to block 312, which depicts RC machine 142 returning the requested cache line to the associated processor core 120 (block 312). Thereafter, the RC machine 142 servicing the load request is released to transition from the busy state to the idle state (block 314), and the process of FIG. 3 ends at block 316.

Figure 4:
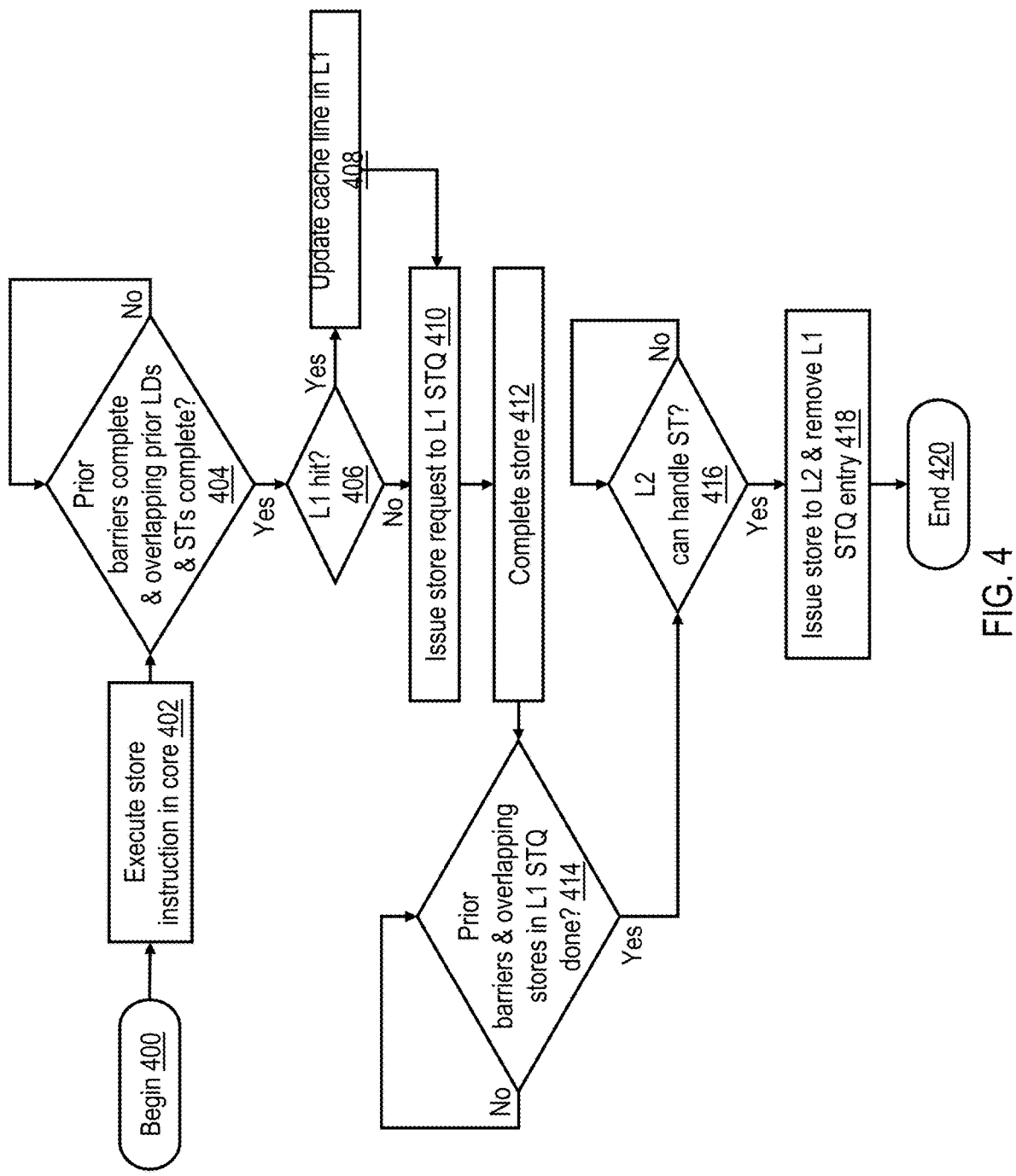
FIG. 4 is a high-level logical flowchart of an exemplary method of processing a store instruction in a processor core in accordance with one embodiment.

With reference now to FIG. 4, there is illustrated a high-level logical flowchart of an exemplary method of processing a store instruction in a processor core in accordance with one embodiment. As depicted, the process begins at block 400 and thereafter proceeds to block 402, which illustrates execution units 124 receiving a store instruction from ISU 122 and then executing the store instruction to calculate a store target address.

Figure 6:
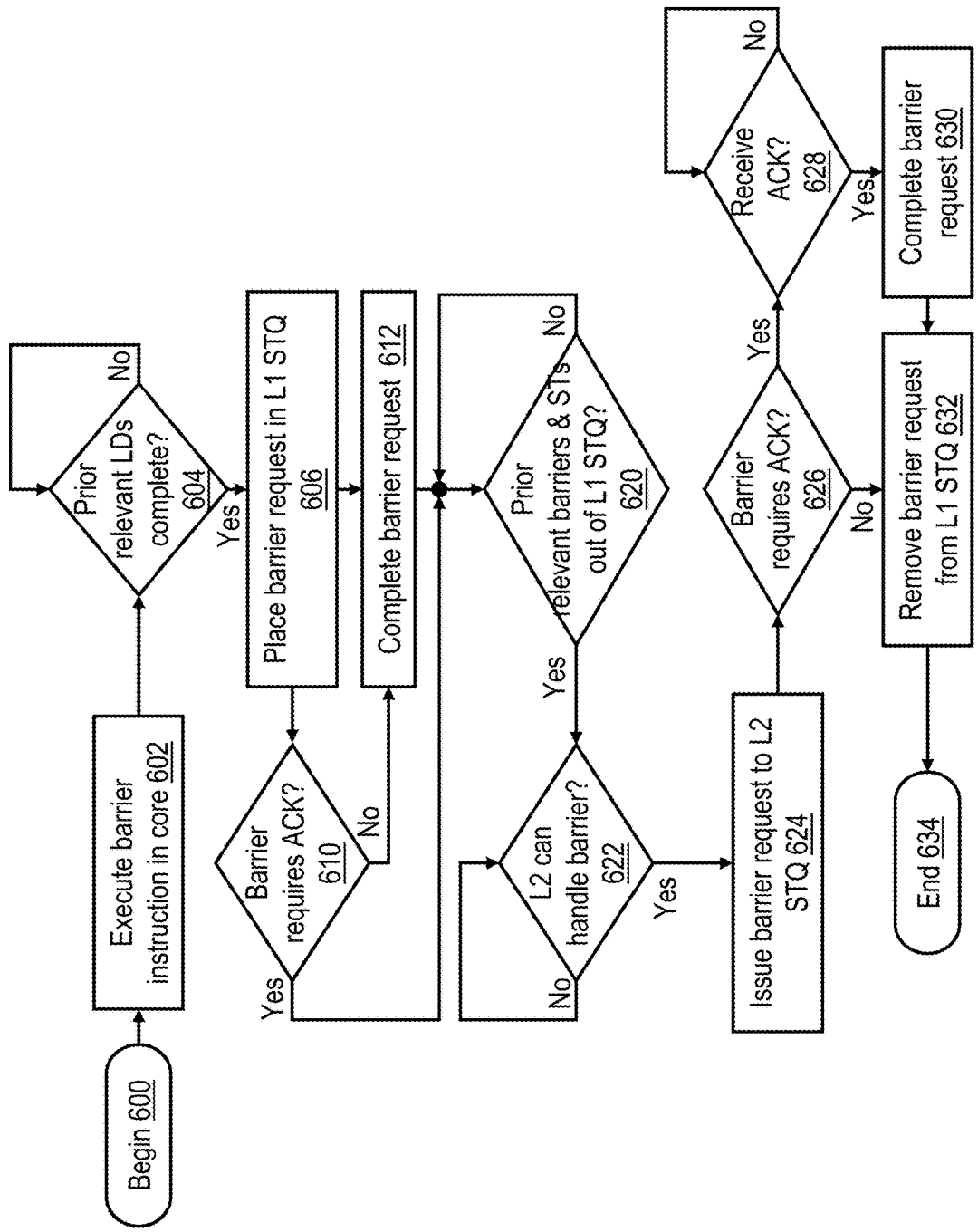
FIG. 6 is a high-level logical flowchart of an exemplary method of processing a barrier instruction in a processor core in accordance with one embodiment.

Following execution of the store instruction, processor core 120 enforces ordering for the store instruction by waiting for the completion of any relevant prior barrier requests (e.g., as shown at FIG. 6, blocks 612 and 630), as well as the completion of any prior overlapping load request or store request targeting the same memory locations as the store instruction executed at block 402 (block 404). Once processor core 120 enforces any necessary ordering for the store instruction at block 404, the process passes to block 406. At block 406, processor core 120 determines, via a lookup of the store target address calculated by the store instruction, whether or not the store target address hits in L1 cache 126. If so, processor core 120 updates the target cache line held in L1 cache 126 (block 408). Following block 408 or in response to the store target address missing in L1 cache 126 at block 406, processor core 120 places a store request corresponding to the executed store instruction into L1 STQ 127 (block 410). The store request can include, for example, an indication of the request type, a thread identifier, the store target address calculated by execution of the store instruction, and the store data specified by the operand(s) of the store instruction. In one preferred embodiment, L1 STQ 127 is implemented as a shared queue that buffers and orders store and barrier requests of all threads executing within processor unit 102. In particular, L1 STQ 127 preferably orders processing of all overlapping store requests relative to their chronology and orders processing of all store requests relative to any barrier requests between them. Following insertion of the store request into L1 STQ 127, the store request is completed for ordering purposes (block 412).

As shown at blocks 414-416, L1 STQ 127 buffers the store request until (1) processing of all relevant prior barrier requests buffered in L1 STQ 127 and any prior overlapping store requests buffered in L1 STQ 127 that target the same memory locations are finished and (2) L2 cache 130 has resources available to service the store request (including capacity in L2 STQ 166). In response to affirmative determinations at both of blocks 414 and 416, L1 STQ 127 issues the store request to L2 STQ 166 via store bus 164 (block 418). The store request is removed from L1 STQ 127, and the process of FIG. 4 terminates at block 420.

Figure 5:
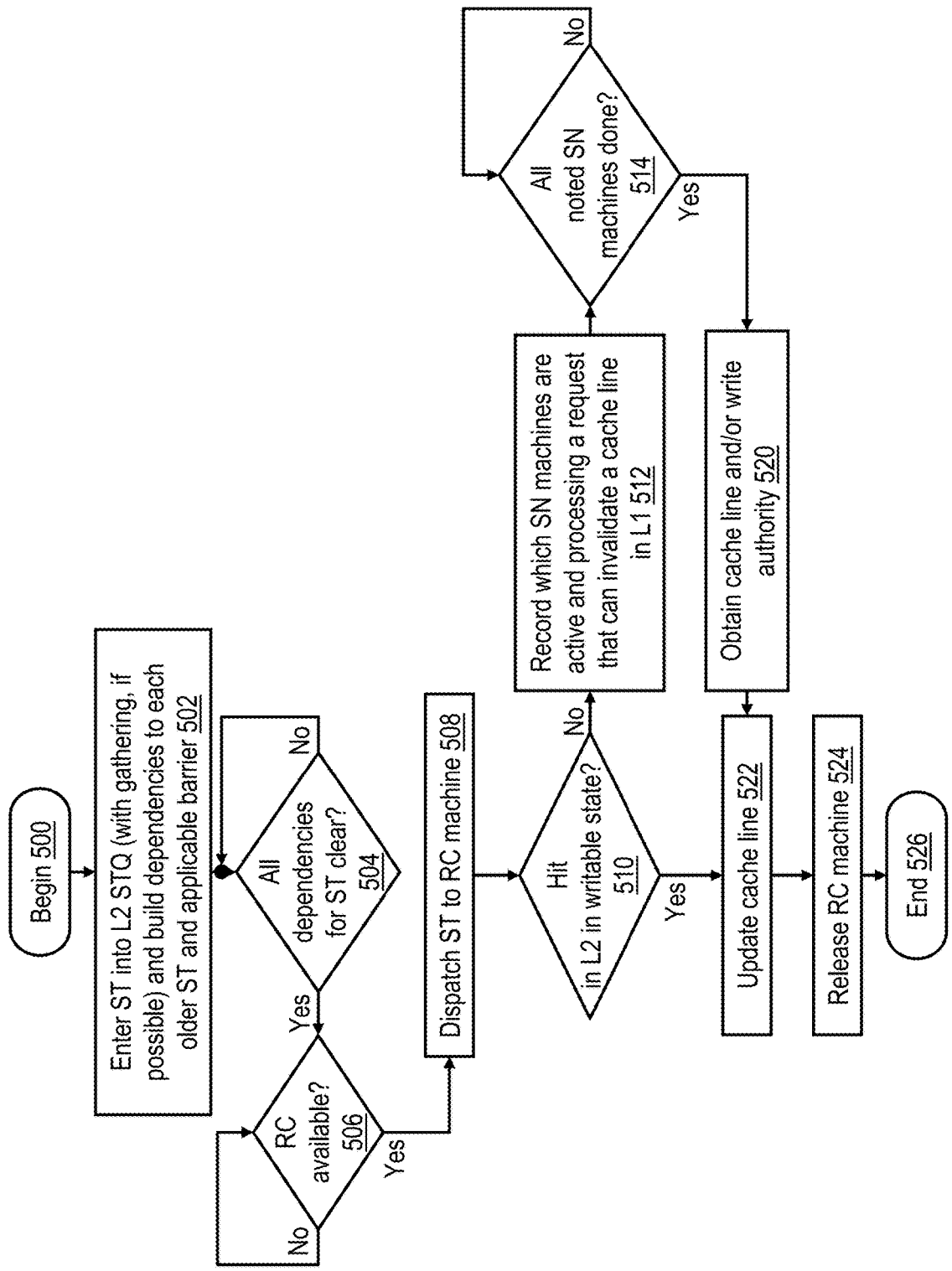
FIG. 5 is a high-level logical flowchart of an exemplary method of processing a store request in a lower level cache in accordance with one embodiment.

Referring now to FIG. 5, there is depicted a high-level logical flowchart of an exemplary method of processing a store request in a lower level cache in accordance with one embodiment. As described above, store requests are received at L2 STQ 166 via store bus 164. In response to receipt of the store request, the store request is gathered, if possible, into an existing entry of L2 STQ 166. If store gathering is not possible, a new entry is allocated in L2 STQ 166 to buffer the store request (block 502). As further illustrated at block 502, L2 STQ 166 also builds a set of dependencies for the store request, meaning that dispatch of the store request from L2 STQ 166 is made dependent on the dispatch from L2 STQ 166 of each older store request to the same cache line (if any) and the completion of processing of each relevant prior barrier request (if any) buffered in L2 STQ 166. Blocks 504-506 illustrate L2 STQ 166 continuing to buffer the store request until all the dependencies (if any) in the set of dependencies built at block 502 have been cleared and an RC machine 142 is available to process the store request. In response to affirmative determinations at both blocks 504 and 506, L2 STQ 166 dispatches the store request to an idle RC machine 142 for processing, as shown at block 508.

In response to receipt of the store request for servicing, the RC machine 142 transitions from an idle state to the busy state. While in the busy state, the RC machine 142 protects the store target address of the store request against any conflicting access to the same store target address executing on another hardware thread of the same processing unit 102 or a different processing unit 102. At block 510, the RC machine 142 determines whether or not the store target address of the store request hits in L2 storage array and directory 140 in a "writeable" coherence state that confers authority on L2 cache 130 to modify the target cache line. If so, the process passes directly to block 522, which is described below. If not, RC machine 142 records which, if any, of the local SN machines 144 are active and processing a snooped request that requires issuance of a back invalidation message to L1 cache 126 (block 512). As will be appreciated, these snooped requests include the store requests of other processing units 102. Block 514 illustrates the RC machine 142 allocated to service the store request then waiting for all of the SN machines 144 (if any) recorded at block 512 to complete processing of their respective snooped requests, thus ensuring any invalidations in L1 cache 126 entailed by the older snooped requests are appropriately ordered prior to servicing of the store request. As discussed below with reference to block 712 of FIG. 7, this ordering is enforced because, in data processing system 100, completion of barriers does not require the invalidating effects of store requests to be applied to the L1 caches 126 in all processor cores 120.

Following block 514, the process of FIG. 5 passes to block 520, which illustrates the RC machine 142 obtaining authority to modify the target cache line and, if necessary, a copy of the target cache line from another cache hierarchy or memory controller 106 by issuing one or more requests on system interconnect 104. These requests will be received by snoop machines 144 of other processing units 102 and will initiate invalidation of any and all shared copies of the target cache line residing in the L1 cache 126 and/or L2 storage array and directory 140 of any other processing unit 102, as discussed with reference to block 306 of FIG. 3 and block 512 of FIG. 5. RC machine 142 then updates the target cache line in L2 storage array and directory 140 with the store data of the store request (block 522). Thereafter, RC machine 142 is released to return to the idle state (block 524), and the process of FIG. 5 ends at block 526.

Referring now to FIG. 6, there is depicted a high-level logical flowchart of an exemplary method of processing a barrier instruction in a processor core in accordance with one embodiment. As depicted, the process begins at block 600 and thereafter proceeds to block 602, which illustrates execution units 124 receiving a barrier instruction from ISU 122 and then executing the barrier instruction.

Following execution of the barrier instruction, processor core 120 enforces ordering of memory accesses following the barrier instruction to any relevant prior load requests by waiting at block 604 for the completion of any relevant prior load requests (e.g., as shown at FIG. 2, block 216). Once processor core 120 enforces any necessary load-to-load or store-to-load ordering for the barrier instruction at block 604, processor core 120 places a barrier request corresponding to the barrier instruction into L1 STQ 127 (block 606). In accordance with one embodiment, the barrier request can include a thread identifier and an indication of the barrier type. In a preferred embodiment, the types of barrier requests include a first type of barrier request that logically propagates (i.e., makes visible) the storage-modifying effects of all prior store requests to all coherence participants in data processing system 100 and therefore requires an ACK (acknowledgment) signaling completion of this propagation. This first type of barrier request is employed, for example, to enforce store-to-load ordering. The types of barrier requests also preferably include a second type of barrier request that enforces store-to-store ordering, but not store-to-load ordering and therefore does not require an ACK.

At block 610, L1 STQ 127 determines by reference to the specified barrier type whether or not the barrier request requires an ACK. If not, L1 STQ 127 completes the barrier request (block 612), as discussed above at block 204 of FIG. 2 and block 404 of FIG. 4. Following block 612 or in response to an affirmative determination at block 610, the process passes to block 620. As shown at blocks 620-622, L1 STQ 127 buffers the barrier request until (1) processing of all relevant prior barrier requests buffered in L1 STQ 127 and any relevant prior store requests buffered in L1 STQ 127 are finished and (2) L2 cache 130 has available resources to service the barrier request (including capacity in L2 STQ 166). In response to affirmative determinations at both of blocks 620 and 622, L1 STQ 127 issues the barrier request to L2 STQ 166 via store bus 164 (block 624).

As indicated at block 626, if the barrier request is of the second type not requiring an ACK, the process passes directly to block 632, which is described below. If, however, the barrier request is of the first type and therefore requires an ACK, L1 STQ 127 continues to buffer the barrier request until an ACK for the barrier request is returned by the associated L2 cache 130 (block 628). In response to receipt of the ACK, which indicates logical propagation of the effects of any prior store requests to all coherence participants in data processing system 100, L1 STQ 127 completes the barrier request (block 630). Thereafter, L1 STQ 127 removes the barrier request from L1 STQ 127 (block 632), and the process of FIG. 6 terminates at block 634.

Figure 7:
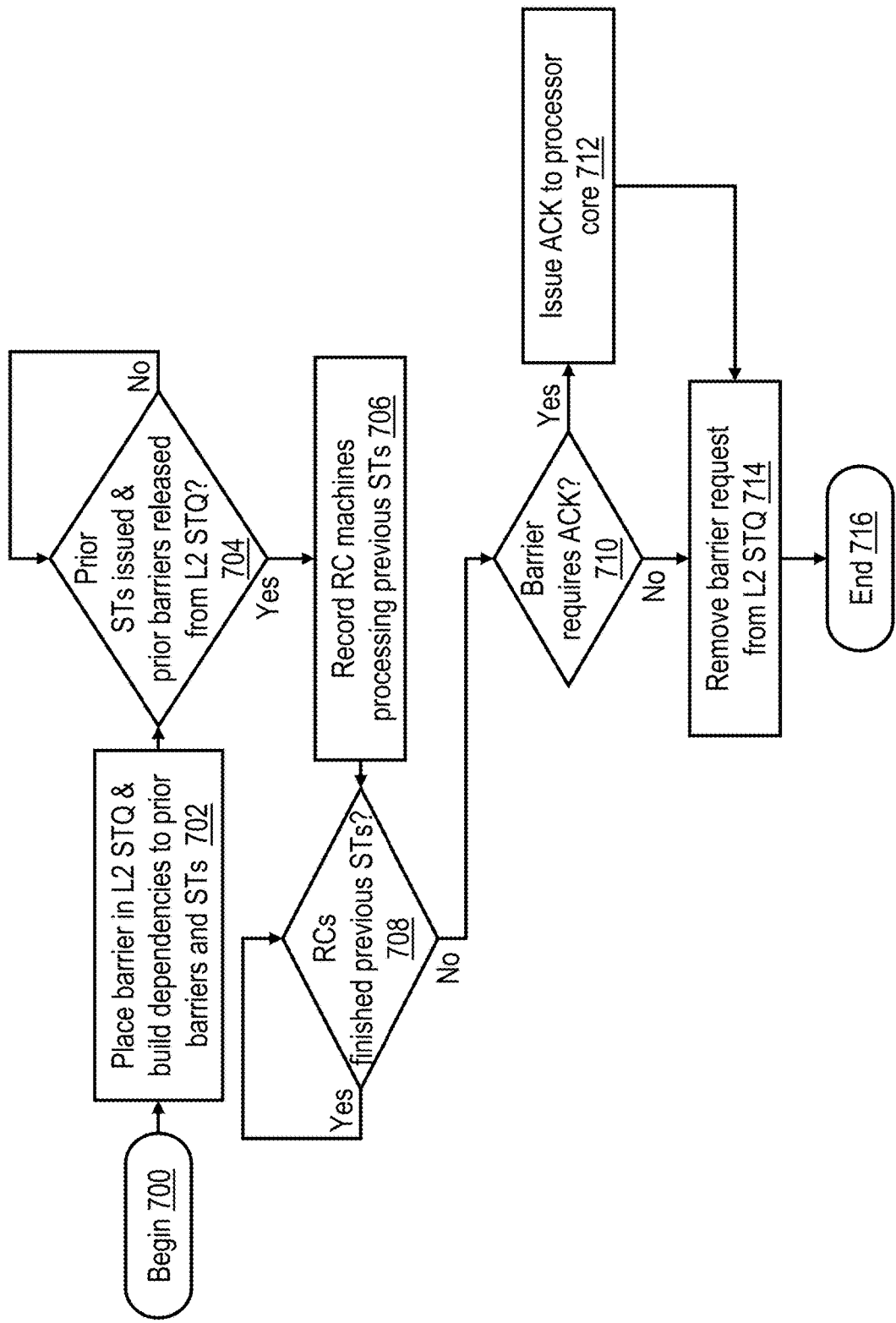
FIG. 7 is a high-level logical flowchart of an exemplary method of processing a barrier request in lower level cache in accordance with one embodiment.

With reference now to FIG. 7, there is illustrated a high-level logical flowchart of an exemplary method of processing a barrier request in a lower level cache in accordance with one embodiment. As described above, barrier requests are received at L2 STQ 166 via store bus 164. In response to receipt of the barrier request, the barrier request is buffered in an available entry of L2 STQ 166 (block 702). As further illustrated at block 702, L2 STQ 166 builds a set of dependencies for the barrier request, meaning that further processing of the barrier request is made dependent on the dispatch of each relevant older store request (if any) from L2 STQ 166 and the removal of each relevant older barrier request (if any) buffered in L2 STQ 166. Block 704 illustrates L2 STQ 166 continuing to buffer the barrier request until all the dependencies (if any) in the set of dependencies built at block 702 have been cleared.

In response to a determination at block 704 that all dependencies have been cleared, L2 STQ 166 records the RC machines 142 (if any) that are busy processing store requests preceding the barrier request (block 706). L2 STQ 166 then monitors at block 708 for completion of processing by RC machines 142 of each of the prior store requests recorded at block 706. It should be noted that completion of these store request in turn depends on the invalidations entailed by the store requests being successfully loaded into the SN machines 144 of the relevant coherence participants throughout data processing system 100, as discussed above with reference to block 520 of FIG. 5. Those skilled in the art will recognizes that the logging of the invalidations into SN machines 144 does not mean that the relevant cache lines in L1 caches 126 (if any) have been invalidated. In response to a determination at block 708 that all the RC machines 142 have completed processing of the prior store requests noted at block 706, L2 STQ 166 determines at block 710 whether the barrier request is of the first barrier type that requires an ACK, and if so, provides an ACK for the barrier request to the associated processor core 120 (block 712). Following block 712 or in response to a determination at block 710 that the barrier request does not require an ACK, L2 STQ 166 removes the barrier request from L2 STQ 166 (block 714). Thereafter, the process of FIG. 7 ends at block 716.

Those skilled in the art will appreciate that the ACK issued to the processor core 120 at block 712 logically indicates that the effects of all preceding store requests have been made fully visible to all processor cores 120, when, in fact, the effects of the preceding store requests (i.e., invalidation of any other copies of the target cache lines) have only been registered in the SN machines 144 of all processing units 102. To account for this disparity, the invalidations of any other copies of the target cache lines is enforced when memory access requests that may access such cache lines are processed by RC machines 142, as discussed above for loads at blocks 306-308 of FIG. 3 and for stores at blocks 512-514 of FIG. 5.

Figure 8:
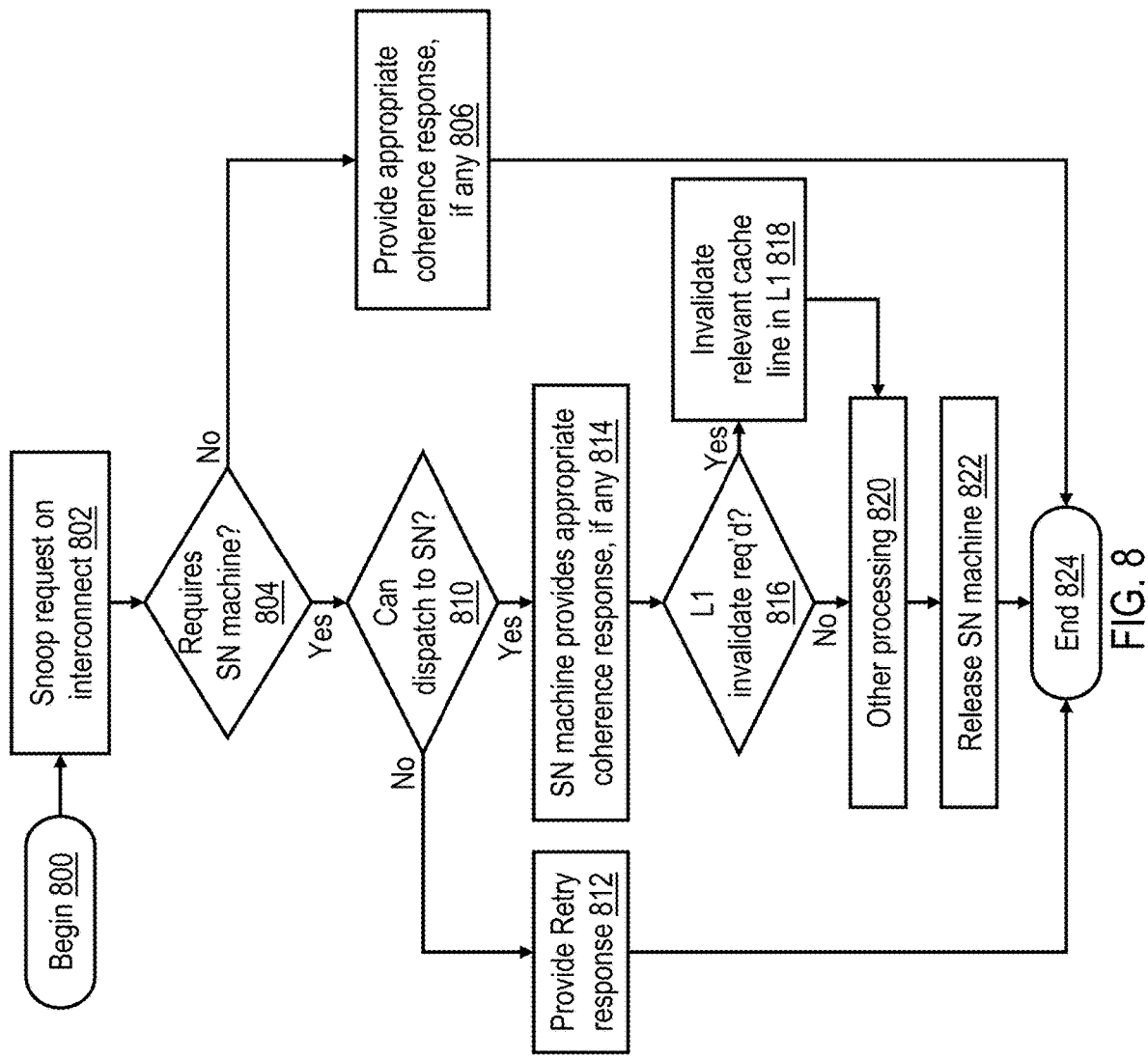
FIG. 8 is a high-level logical flowchart of an exemplary method by which a snoop machine processes a snooped request in accordance with one embodiment.

Referring now to FIG. 8, there is depicted a high-level logical flowchart of an exemplary method by which the L2 cache 130 of a processing unit 102 services a request snooped from a system interconnect in accordance with one embodiment. Those skilled in the art will appreciated that multiple instances of this process can be active in a given L2 cache 230 concurrently.

As depicted, the process begins at block 800 and thereafter proceeds to block 802, which illustrates an L2 cache 130 snooping a request (e.g., issued by anther processing unit 102) on system interconnect 104 via snoop bus 170. Following block 802, L2 cache 130 determines at block 804 whether or not servicing the snooped request requires allocation of a SN machine 144. If not, no SN machine 144 is dispatched to service the snooped request. The L2 cache 130 will nevertheless provide the appropriate coherence response, if any (block 806). Thereafter, the process of FIG. 8 ends at block 824. Returning to block 804, if a determination is made that servicing the snooped request requires allocation of a SN machine 144, L2 cache 130 further determines at block 810 whether or not a SN machine 144 can presently be dispatched. In order to dispatch a SN machine 144, a SN machine 144 must be available (i.e., in the idle state), and generally no RC machine 146 or SN machine 144 can be busy servicing a request having a target cache line address matching that specified by the snooped request (among other dispatch constraints).

In response to a determination at block 810 that a SN machine 144 cannot presently be dispatched to service the snooped request, L2 cache 130 provides a Retry coherence response on system interconnect 104 to indicate its present inability to service the snooped request (block 812). (In response to this Retry coherence response, the source of the snooped request may later represent the request on system interconnect 104.) Following block 812, the process ends at block 824. If, however, L2 cache 130 determines at block 810 that a SN machine 144 can presently be dispatched to service the snooped request, L2 cache 130 dispatches an idle SN machine 144 to service the snooped request. The dispatched snoop machine 144 transitions from the idle state to the busy state and then provides the appropriate protocol-dependent coherence response, if any, for the snooped request (block 814). In addition, SN machine 144 determines, for example, based on whether the target address of the snooped request hit in L2 storage array and directory 140 on an entry marked as inclusive, whether invalidation of a copy of the target cache line in the associated L1 cache 126 is required (block 816). If so, SN machine 144 issues a back invalidate message to processor core 120 to invalidate the copy of the target cache line of the snooped request held in L1 cache 126 (block 818). Following block 818 or in response to a negative response at block 816, the SN machine 144 performs at block 820 whatever additional processing is required to service the snooped request (e.g., updating L2 storage array and directory 140 and/or L1 cache 110, sourcing a copy of the target cache line, etc.). Following completion of its processing at block 820, the SN machine 144 dispatched to service the snooped request is released to transition from the busy state to the idle state (block 822), and the process of FIG. 8 ends at block 824.

With reference now to FIG. 9, there is illustrated an exemplary instruction sequence including a barrier instruction in accordance with one embodiment. Instruction sequence 900, which can be preceded and followed by any number of instructions, includes a store instruction 902 that, when executed, causes a variable in shared memory (e.g., FLAG) to be updated with a new value (e.g., VALUE). In at least some embodiments, updating FLAG with VALUE may provide an indication to a hardware thread that it may begin processing a data set or initiate some other action. Store instruction 902 and the store request generated by its execution may be processed as described above with reference to FIGS. 4-5.

Store instruction 902 is followed in program order by a barrier instruction 904 (e.g., SYNC), which is a barrier of the first barrier type that causes the storage update initiated by store instruction 902 to logically propagate to all coherence participants. Barrier instruction 904 and the associated barrier request generated by execution of barrier instruction 904 may be processed as described above with reference to FIGS. 6-7.

Barrier instruction 904 is followed in program order by a message send (MSG_SEND) instruction 906, which causes an interrupt to occur at a target processor core 120, for example, one executing the hardware thread that is to process a data set or perform some other action in response to the update of FLAG to VALUE. FIG. 10 depicts an exemplary MSG_SEND instruction 906 in accordance with one embodiment. In this example, MSG_SEND instruction 906 includes at least an opcode field 1000 that specifies the operation code for a MSG_SEND instruction and a register field 1002 that specifies the core register 123 (e.g., rA) of the executing processor core 120 that identifies the target processor core 120 to be interrupted.

At an architectural level, barrier instruction 904 is designed to logically order the execution of store instruction 902 and all its storage-modifying and invalidating effects prior to execution of all instructions following barrier instruction 904 subject to ordering by barrier instruction 904 (including MSG_SEND instruction 906). In partial fulfillment of the architecturally defined ordering functions of barrier instruction 904, barrier instruction 904 ensures, at a minimum, that the invalidations of other cached copies of the target cache line required by the update of FLAG with VALUE are registered with snoop machines 144 in all processing units 102 prior to execution of MSG_SEND instruction 906. However, some implementations of barrier instruction 904 such as that set forth in FIGS. 6-7 do not fully fulfill the architectural ordering obligations of barrier instruction 904 by ensuring that the invalidations required by prior store requests are made in all relevant L1 caches 126, but instead rely on, among other things, the processing of load and store requests in L2 cache 130 (as described above with respect to FIGS. 3 and 5) to achieve the logical ordering of post-barrier instructions with respect to these requests putatively required by barrier instruction 904. In accordance with the present invention, care must also be taken in the processing of MSG_SEND instruction 906 to guarantee that the interrupt handler executed by the target processor core 120 interrupted by MSG_SEND instruction 906 will not have visibility to a prior version of the target cache line of store instruction 902 from the L1 cache 126 of the target processor core 120. As described below in greater detail, in various embodiments, such access is prevented by the processing unit 102 containing the target processor core 120 causing all back-invalidates of prior snooped requests to be performed prior to execution of the relevant interrupt handler instructions on the target processor core 120.

Figure 12:
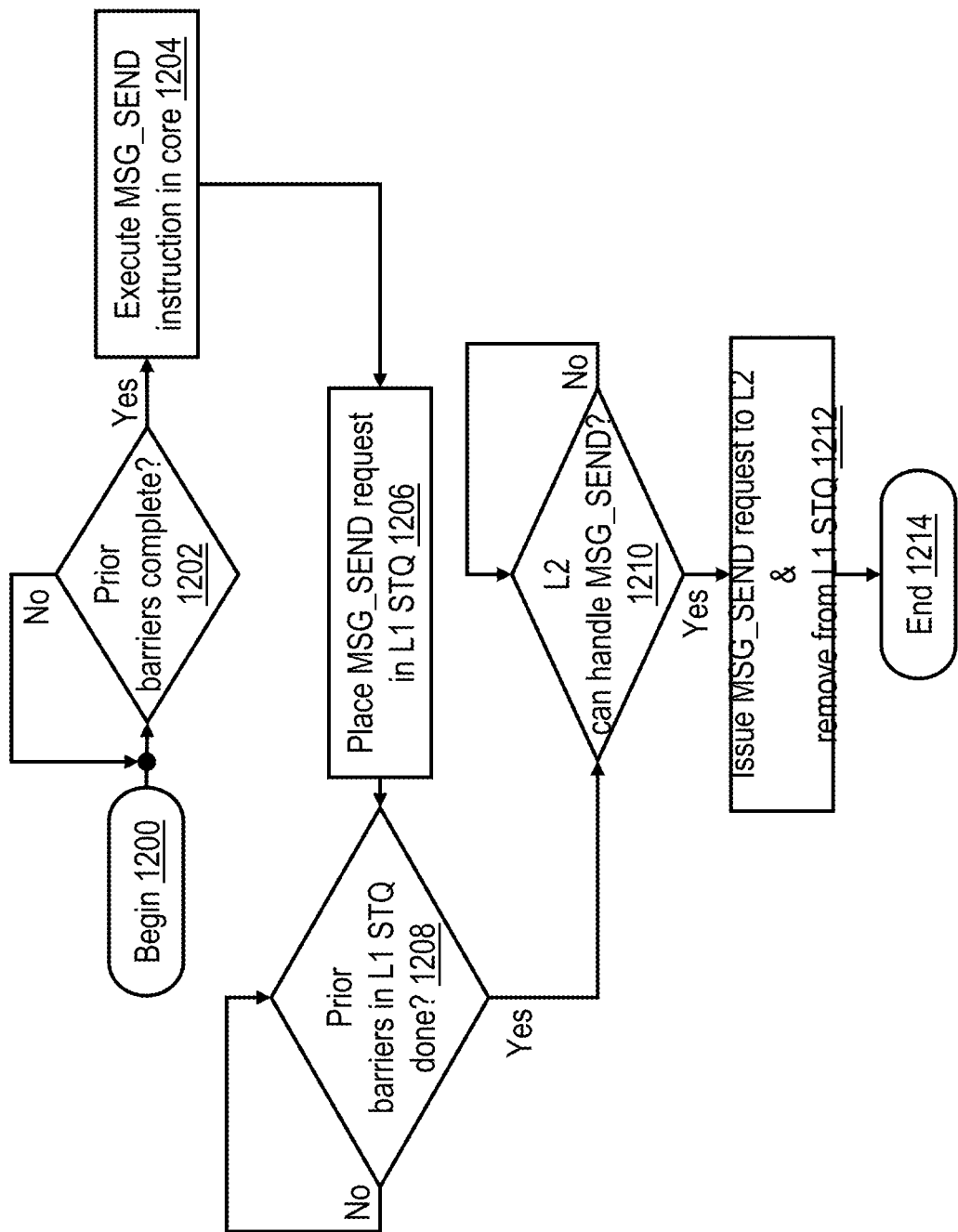
FIG. 12 is a high-level logical flowchart of an exemplary method of processing a MSG_SEND instruction in a processor core in accordance with one embodiment.

Referring now to FIG. 12, there is depicted a high-level logical flowchart of an exemplary method of processing a MSG_SEND instruction (e.g., MSG_SEND instruction 906) in a processor core in accordance with one embodiment. The process begins at block 1200, for example, in response to receipt by the execution units 124 of a processor core 120 of a MSG_SEND instruction from ISU 122. As indicated at block 1202, execution units 124 order execution of the MSG_SEND instruction with respect to prior barriers by waiting at block 1202 until any relevant prior uncompleted barrier requests have completed. Following block 1202, execution units 124 execute the MSG_SEND instruction (block 1204) and place a corresponding MSG_SEND request in L1 STQ 127 (block 1206). The MSG_SEND request preferably includes at least a request type and an identifier of the target processor core to be interrupted. As shown at blocks 1208-1210, L1 STQ 127 buffers the MSG_SEND request until (1) processing of all relevant prior barrier requests buffered in L1 STQ 127 are finished and (2) L2 cache 130 has available resources to service the MSG_SEND request (including capacity in L2 STQ 166). In response to affirmative determinations at both of blocks 1208 and 1210, L1 STQ 127 issues the MSG_SEND request to L2 STQ 166 via store bus 164 and removes the MSG_SEND request from L1 STQ 127 (block 1212). Thereafter, the process of FIG. 12 ends at block 1214.

Figure 13:
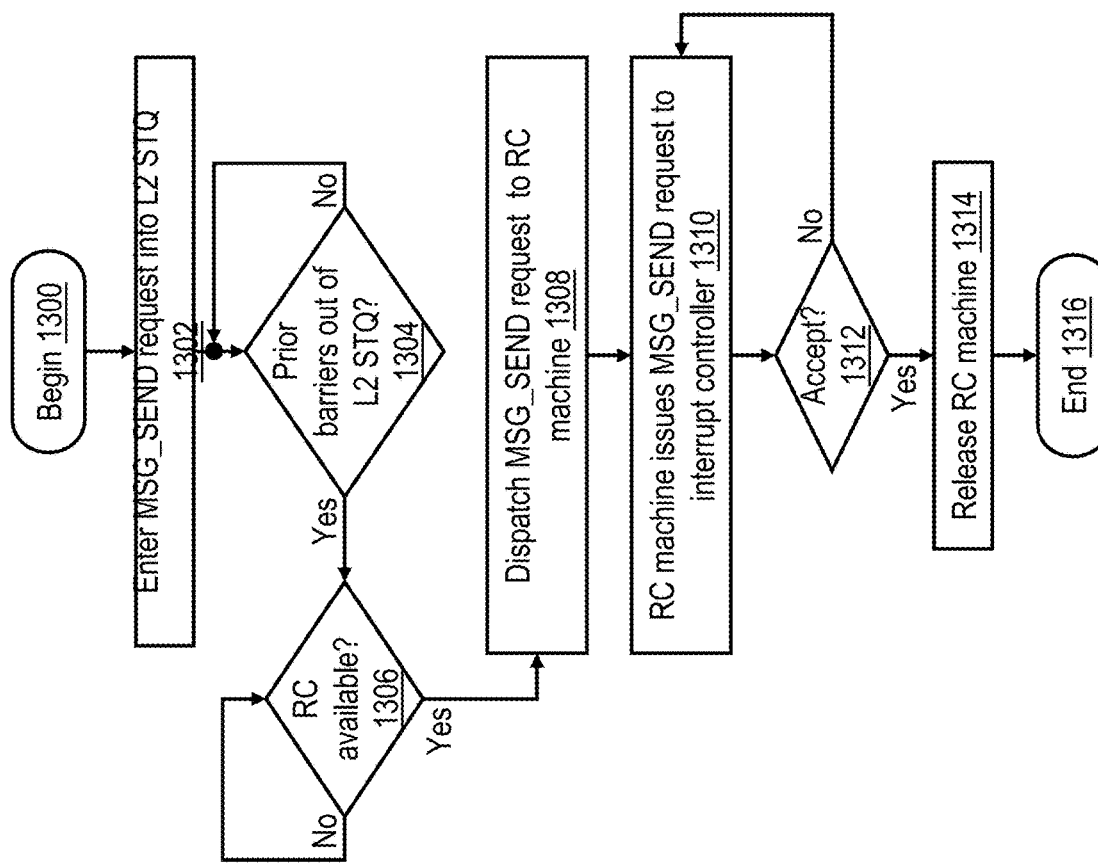
FIG. 13 is a high-level logical flowchart of an exemplary method of processing a MSG_SEND request in a lower level cache in accordance with one embodiment.

With reference now to FIG. 13, there is illustrated a high-level logical flowchart of an exemplary method of processing a MSG_SEND request in a lower level cache in accordance with one embodiment. The process of FIG. 13 begins at block 1300 and then proceeds to block 1302, which illustrates an L2 STQ 166 receiving and entering into an available entry a MSG_SEND request of the associated processor core 120. Blocks 1304-1306 illustrate L2 STQ 166 continuing to buffer the MSG_SEND request until all relevant prior barrier requests (if any) have been removed from L2 STQ 166 and an RC machine 142 is available to process the MSG_SEND request. In response to affirmative determinations at both blocks 1304 and 1306, L2 STQ 166 dispatches the MSG_SEND request an idle RC machine 142 for processing (block 1308) and removes the MSG_SEND request from L2 STQ 166.

In response to receipt of the MSG_SEND request for servicing, the RC machine 142 transitions from an idle state to the busy state. While in the busy state, the RC machine 142 issues the MSG_SEND request to interrupt controller 109 via system interconnect 104 one or more times until an Accept coherence response indicating acceptance of the MSG_SEND request is received (blocks 1310-1312). In response to receipt of the Accept coherence response indicating acceptance of the MSG_SEND request by interrupt controller 109, the RC machine 142 is released to return to the idle state (block 1314), and the process of FIG. 13 ends at block 1316.

Figure 14:
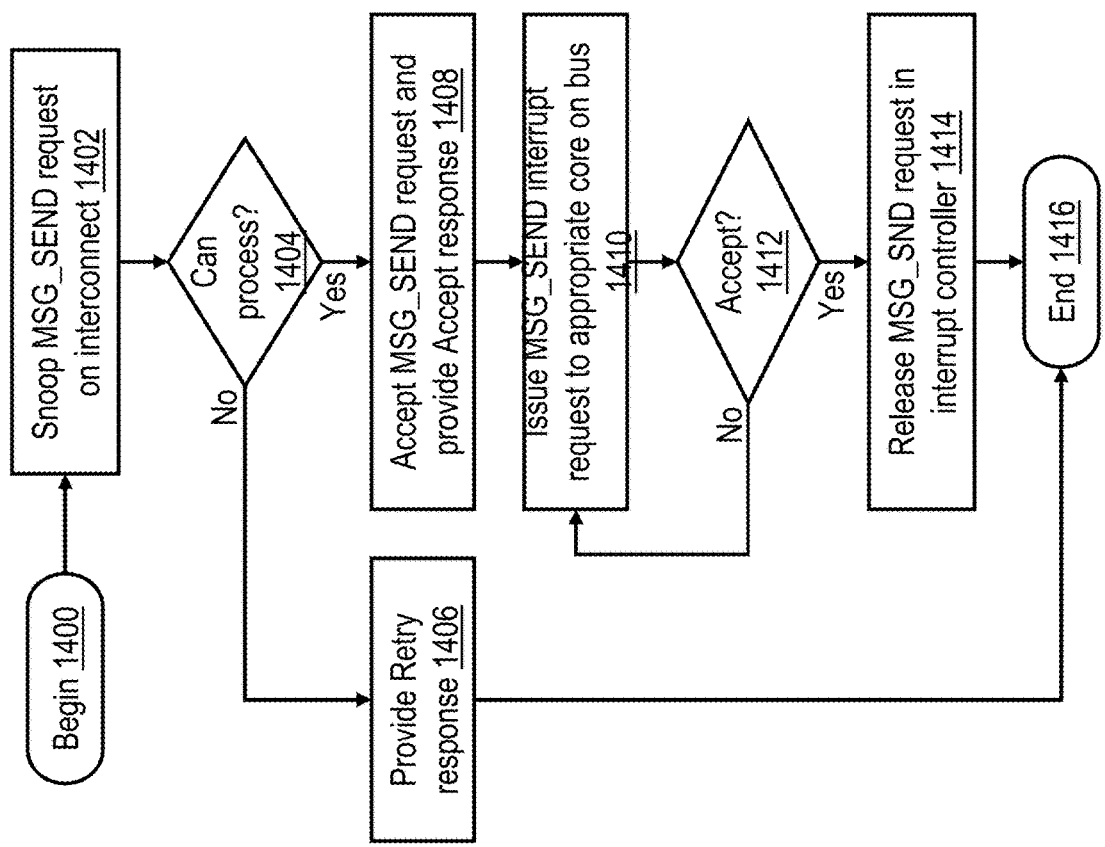
FIG. 14 is a high-level logical flowchart of an exemplary method of processing a MSG_SEND request in an interrupt controller in accordance with one embodiment.

Referring now to FIG. 14, there is depicted a high-level logical flowchart of an exemplary method of processing a MSG_SEND request in an interrupt controller in accordance with one embodiment. The process of FIG. 14 begins at block 1400 and then proceeds to block 1402, which depicts interrupt controller 109 snooping on system interconnect 104 the MSG_SEND request issued by an RC machine 142 at block 1310 of FIG. 13. In response to snooping the MSG_SEND request, interrupt controller 109 determines at block 1404 whether or not it is presently able to process the MSG_SEND request. If not, interrupt controller 109 provides a Retry coherence response (block 1406), which will cause the RC machine 142 to reissue the MSG_SEND request.

If, however, interrupt controller 109 determines at block 1404 that it is presently able to process the MSG_SEND request, interrupt controller 109 accepts the MSG_SEND request and provides an Accept coherence response indicating acceptance of the MSG_SEND request (block 1408). In response to acceptance of the MSG_SEND request, interrupt controller 109 then issues a MSG_SEND interrupt request to the appropriate processor core 120 via system interconnect 104 one or more times until an Accept coherence response is received (block 1410-1412). In response to the Accept coherence response, interrupt controller 109 releases the MSG_SEND request (block 1414), and the process of FIG. 14 ends at block 1416.

Figure 15:
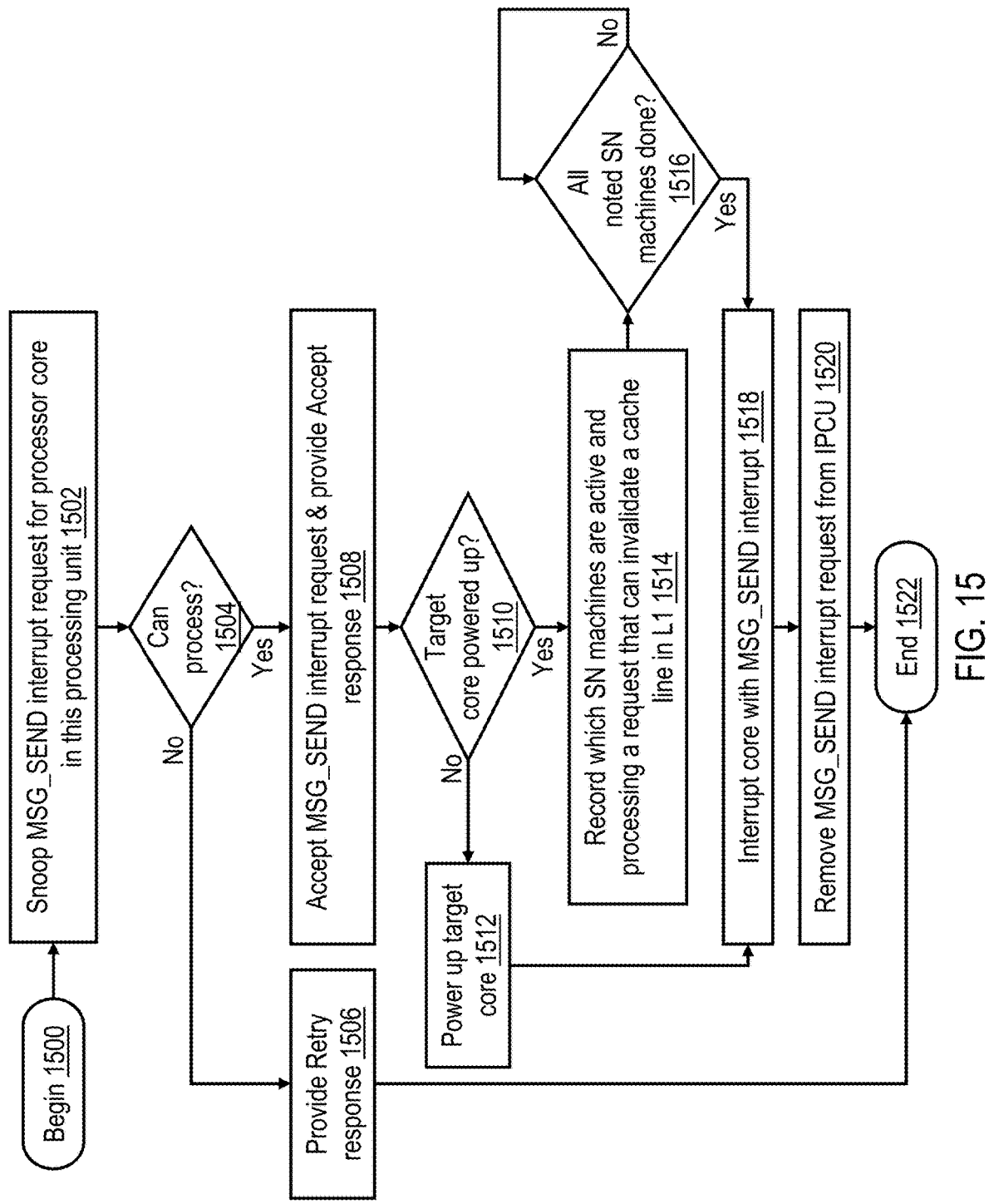
FIG. 15 is a high-level logical flowchart of an exemplary method of processing a snooped MSG_SEND interrupt request in accordance with a first embodiment.

With reference now to FIG. 15, there is illustrated a high-level logical flowchart of an exemplary method of processing a snooped MSG_SEND interrupt request in accordance with a first embodiment. The illustrated process can be performed, for example, by the IPCU 146 of the processing unit 102 containing the target processor core 120 of the MSG_SEND interrupt request.

The process of FIG. 15 begins at block 1500 and then proceeds to block 1502, which depicts an IPCU 146 snooping a MSG_SEND interrupt request for a processor core 120 in its processing unit 102 issued by interconnect controller 109 on system interconnect 104. In response to receipt of the MSG_SEND interrupt request, IPCU 146 determines at block 1504 whether or not it is presently able to process the MSG_SEND interrupt request. If not, IPCU 146 provides a Retry coherence response (block 1506), which will cause the interrupt controller 109 to reissue the MSG_SEND interrupt request.

If, however, IPCU 146 determines at block 1504 that it is presently able to process the MSG_SEND interrupt request, IPCU 146 accepts the MSG_SEND interrupt request and provides an Accept coherence response indicating acceptance of the MSG_SEND interrupt request (block 1508). In response to acceptance of the MSG_SEND interrupt request, IPCU 146 determines at block 1510 whether or not the target processor core 120 is then in a powered-up state. If so, IPCU 146 records which, if any, of the local SN machines 144 are active and processing a snooped request that requires issuance of a back invalidation message to L1 cache 126 (block 1514). Block 1516 illustrates IPCU 146 waiting for all of the SN machines 144 (if any) recorded at block 1514 to complete processing of their respective snooped requests, thus ensuring any invalidations in L1 cache 126 entailed by the older snooped requests are appropriately ordered prior to issuance of the requested MSG_SEND interrupt. Thus, in instruction sequence 900 of FIG. 9, the invalidations required by store instruction 902 (e.g., at block 520 of FIG. 5) are guaranteed to be pushed to L1 caches 126 prior to the interruption of the processor core 120 (and execution of the relevant interrupt handler) requested by MSG_SEND instruction 906.

Returning to block 1510, in response to determining that the target processor core 120 is not in a powered-up state, IPCU 146 services the MSG_SEND interrupt request by first powering up the target processor core 120 (block 1512). IPCU 146 need not enforce any ordering of the MSG_SEND interrupt as shown at blocks 1514-1516 since the processor core 120 has been powered down and will not hold any data in its L1 cache 126 requiring invalidation.

Following block 1516 or block 1512, the process of FIG. 15 passes to block 1518, which illustrates IPCU 146 issuing a MSG_SEND interrupt to the appropriate processor core 120 via interrupt bus 174. IPCU 146 then removes the MSG_SEND interrupt request (block 1520), and the process of FIG. 15 ends at block 1522.

Figure 16:
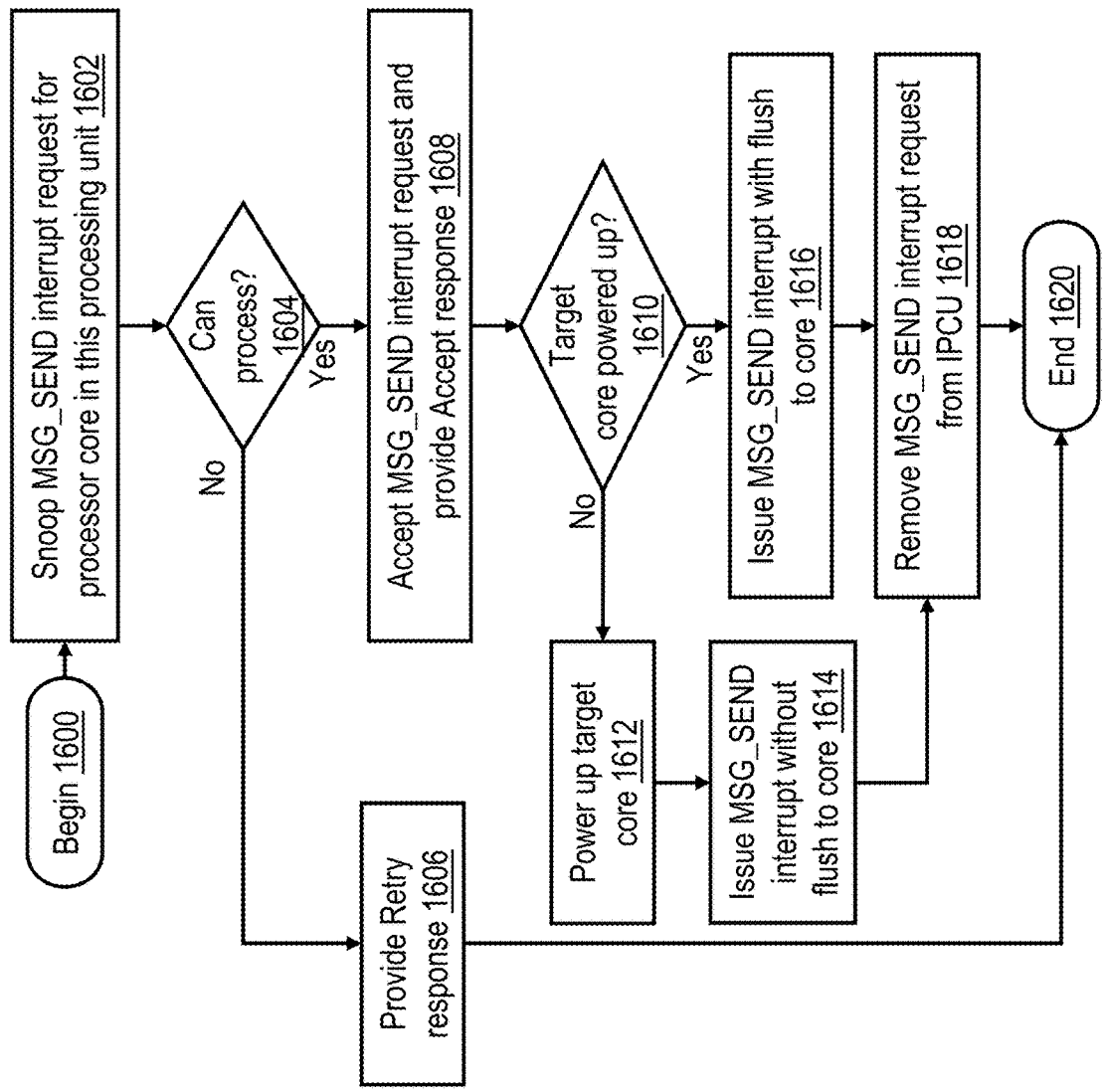
FIG. 16 is a high-level logical flowchart of an exemplary method of processing a snooped MSG_SEND interrupt request in accordance with a second embodiment.
Figure 17:
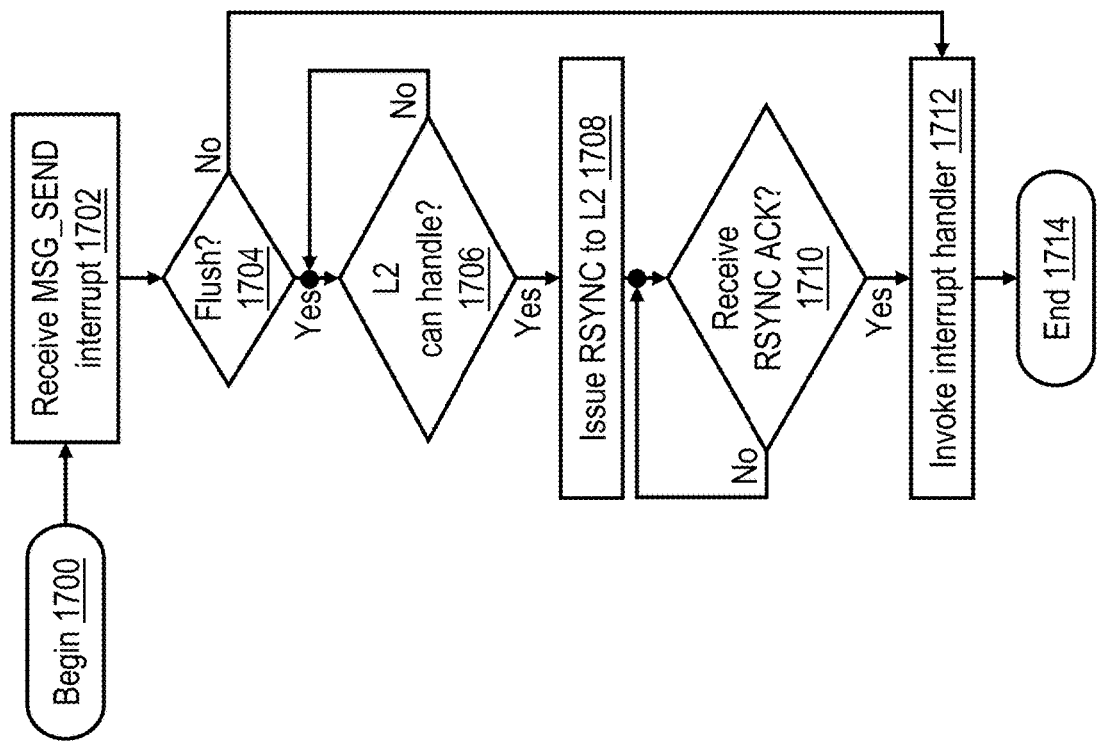
FIG. 17 is a high-level logical flowchart of an exemplary method of processing a MSG_SEND interrupt in a processor core in accordance with the second embodiment.
Figure 18:
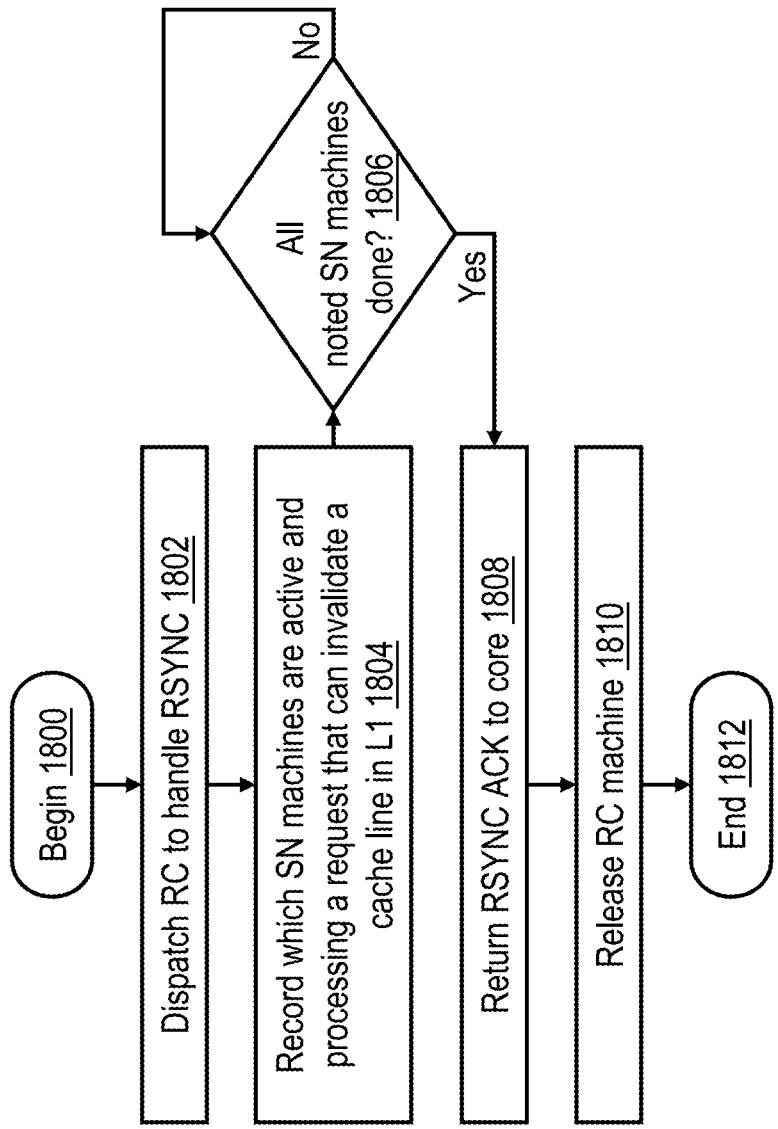
FIG. 18 is a high-level logical flowchart of an exemplary method of processing a RSYNC request in a lower level cache in accordance with the second embodiment.

Referring now to FIG. 16, there is depicted a high-level logical flowchart of an exemplary method of processing a snooped MSG_SEND interrupt request in accordance with a second embodiment. The illustrated process can be performed, for example, by the IPCU 146 of the processing unit 102 containing the target processor core 120 of the MSG_SEND interrupt. It should be appreciated that the processes given in FIG. 16 and FIGS. 17-18 represent an alternative implementation to the process illustrated in FIG. 15.

The process begins at block 1600 and then proceeds to block 1602, which depicts an IPCU 146 snooping a MSG_SEND interrupt request for a processor core 120 in its processing unit 102 issued by interconnect controller 109 on system interconnect 104. In response to receipt of the MSG_SEND interrupt request, IPCU 146 determines at block 1604 whether or not it is presently able to process the MSG_SEND interrupt request. If not, IPCU 146 provides a Retry coherence response (block 1606), which will cause the interrupt controller 109 to reissue the MSG_SEND interrupt request on system interconnect 104.

If, however, IPCU 146 determines at block 1604 that it is presently able to process the MSG_SEND interrupt request, IPCU 146 accepts the MSG_SEND interrupt request and provides an Accept coherence response indicating acceptance of the MSG_SEND interrupt request (block 1608). In response to acceptance of the MSG_SEND interrupt request, IPCU 146 determines at block 1610 whether or not the target processor core 120 is then in a powered-up state. If so, IPCU 146 services the MSG_SEND interrupt request by issuing a MSG_SEND interrupt to processor core 120 via interrupt bus 174 (block 1616).

FIG. 11 illustrates an exemplary format of the MSG_SEND interrupt in the second embodiment. In this example, MSG_SEND interrupt 1100 includes an interrupt type field 1102 indicating the type of interrupt and a flush field 1104 having alternative set and reset states respectively indicating whether or not prior snooped invalidating operations are to be processed in advance of the indicated MSG_SEND interrupt. At block 1616, the MSG_SEND interrupt is sent with flush field 1104 set because the L1 cache 126 of the target processor core 120 may hold one or more cache lines that may need to be invalidated by one or more snooped requests preceding the interrupt.

Returning to block 1610, if IPCU 146 determines that the target processor core 120 is not in a powered-up state, IPCU 146 powers up the target processor core 120 (block 1612). In addition, at block 1614, IPCU 146 issues a MSG_SEND interrupt to processor core 120 via interrupt bus 174 with flush field 1104 reset. In this case, IPCU 146 need not enforce any ordering of the MSG_SEND interrupt with respect to prior snooped requests because the processor core 120 has been powered down and will not hold any data in L1 cache 126 requiring invalidation. Following either block 1616 or block 1614, IPCU 146 removes the MSG_SEND interrupt request (block 1618), and the process of FIG. 16 ends at block 1620.

With reference now to FIG. 17, there is illustrated a high-level logical flowchart of an exemplary method of processing a MSG_SEND interrupt in a processor core in accordance with the second embodiment. The process of FIG. 17 begins at block 1700 and then proceeds to block 1702, which depicts the target processor core 120 receiving the MSG_SEND interrupt via interrupt bus 174. Following receipt of the MSG_SEND interrupt, processor core 120 preferably finishes execution of in-flight instructions, but defers execution by execution units 124 of any instructions in the interrupt handler until any invalidations logged into SN machines 144 of the associated L2 cache 130 have been processed, as described below. In response to receipt of the MSG_SEND interrupt, processor core 120 determines by reference to flush field 1104 of the MSG_SEND interrupt whether or not a flush is required (block 1704). If not, the process passes to block 1712, which illustrates the processor core 120 invoking the relevant interrupt handler. Thereafter, the process of FIG. 17 ends at block 1714.

Returning to block 1704, in response to the processor core 120 determining by reference to flush field 1104 that the MSG_SEND interrupt requires a flush, processor core 120 waits at block 1706, if necessary, until the associated L2 cache 130 has resources available to handle a request (e.g., including an available RC machine 142), and then issues an RSYNC request to the associated L2 cache 130 (block 1708). The RSYNC request is preferably not ordered with any requests that may be present in L1 STQ 127. Processor core 120 then waits at block 1710 until L2 cache 130 indicates, via an RSYNC ACK response, that all prior snooped requests that may invalidate a cache line in L1 cache 126 have completed processing in L2 cache 130. In response to receipt of the RSYNC ACK response from the associated L2 cache 130, processor core 120 invokes the relevant interrupt handler (block 1712). Thereafter, the process of FIG. 17 ends at block 1714.

Referring now to FIG. 18, there is depicted a high-level logical flowchart of an exemplary method of processing a RSYNC request in lower level cache in accordance with the second embodiment. The process of FIG. 18 begins at block 1800 and then proceeds to block 1802, which illustrates L2 cache 130 dispatching an available RC machine 142 to process the RSYNC request. The RC machine 142 records which, if any, of the local SN machines 144 are active and processing a snooped request that requires issuance of a back invalidation message to L1 cache 126 (block 1804). Block 1806 illustrates the RC machine 142 then waiting for all of the SN machines 144 (if any) recorded at block 1804 to complete processing of their respective snooped requests, thus ensuring any invalidations in L1 cache 126 entailed by the older snooped requests are appropriately ordered prior to handling of the MSG_SEND interrupt. The steps performed at block 1804-1806 ensure that, in exemplary instruction sequence 900 of FIG. 9, the invalidations required by store instruction 902 (e.g., at block 520 of FIG. 5) are guaranteed to be performed in L1 cache 126 prior to the execution of the interrupt handler by the target processor core 120 identified by MSG_SEND instruction 906. Following block 1806, RC machine 142 returns to the associated processor core 120 an RSYNC ACK response (block 1808), which confirms completion of the ordering of the interrupt with respect to any prior snooped invalidating requests. The RC machine 142 is thereafter released to return to an idle state (block 1810), and the process of FIG. 18 ends at block 1812.

FIG. 15 thus discloses a first embodiment in which ordering of a message send interrupt with respect to any prior invalidating snooped requests is managed directly by an interrupt unit in the processing unit containing the target processor core of the interrupt, where the interrupt unit "pushes" any necessary invalidations from the lower level cache to the upper level cache in the target processor core prior to interrupting the processor core and executing the interrupt handler. FIGS. 16-18 discloses an alternative second embodiment in which ordering of a message send interrupt with respect to any prior invalidating snooped requests is managed by the target processor core itself, where the target processor core "pulls" any necessary invalidations from the lower level cache to the upper level cache through generation and issuance of an RSYNC request to the lower level cache prior to execution of instructions in the interrupt handler. Those skilled in the art will appreciate that still other embodiments enforcing ordering between an interrupt and any prior invalidating snooped requests are possible. For example, in a third embodiment, the processor core may execute an explicit RSYNC instruction (e.g., as a first instruction of the interrupt handler) to cause an RSYNC request to be sent to the lower level cache.

Figure 19:
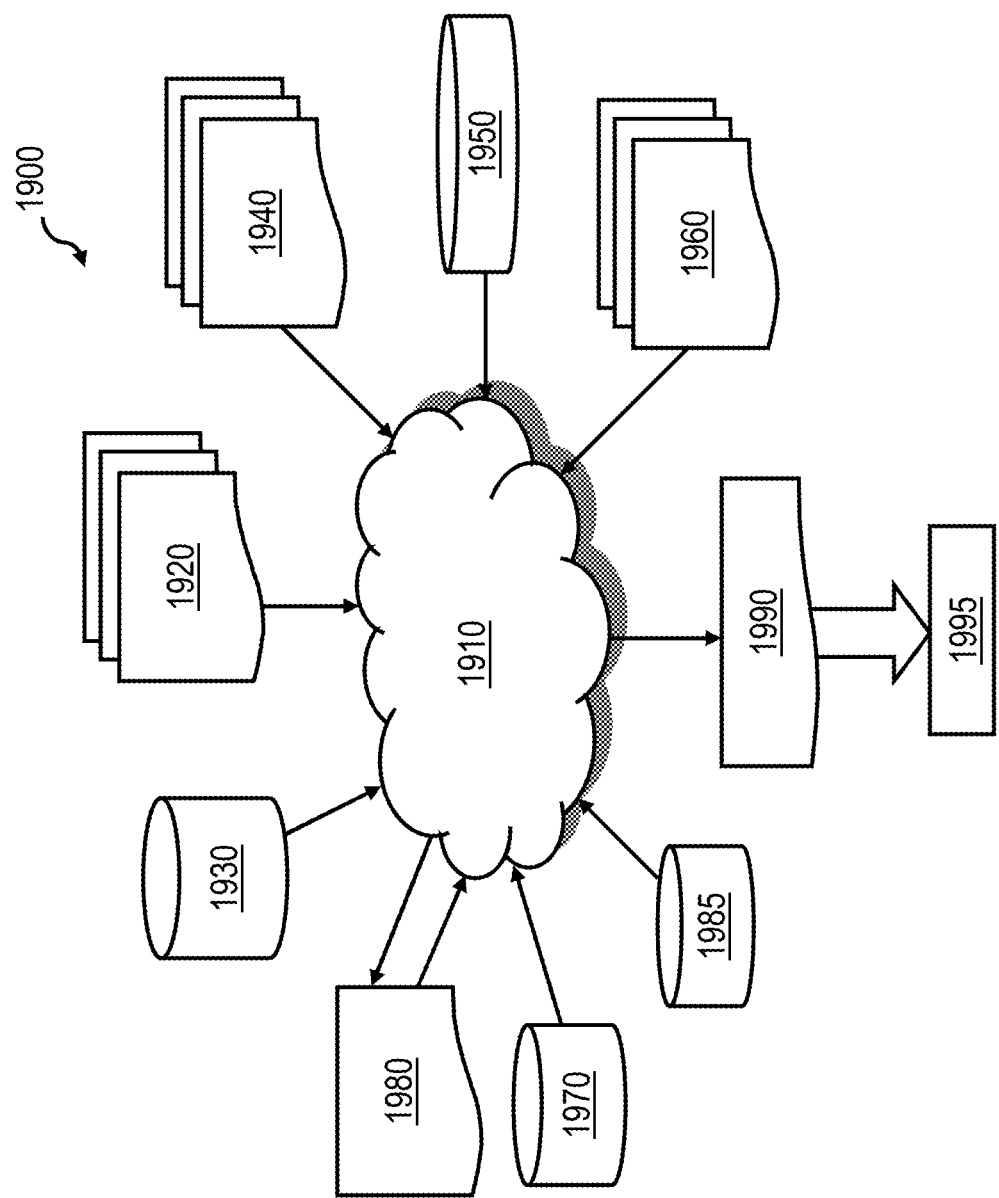
FIG. 19 is a block diagram of an exemplary design flow.

With reference now to FIG. 19, there is illustrated a block diagram of an exemplary design flow 1900 used for example, in semiconductor IC logic design, simulation, test, layout, and manufacture. Design flow 1900 includes processes, machines and/or mechanisms for processing design structures or devices to generate logically or otherwise functionally equivalent representations of the design structures and/or devices described above and shown herein. The design structures processed and/or generated by design flow 1900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1900 may vary depending on the type of representation being designed. For example, a design flow 1900 for building an application specific IC (ASIC) may differ from a design flow 1900 for designing a standard component or from a design flow 1900 for instantiating the design into a programmable array, for example a programmable gate array (PGA) or a field programmable gate array (FPGA) offered by Altera® Inc. or Xilinx® Inc.

FIG. 19 illustrates multiple such design structures including an input design structure 1920 that is preferably processed by a design process 1910. Design structure 1920 may be a logical simulation design structure generated and processed by design process 1910 to produce a logically equivalent functional representation of a hardware device. Design structure 1920 may also or alternatively comprise data and/or program instructions that when processed by design process 1910, generate a functional representation of the physical structure of a hardware device. Whether representing functional and/or structural design features, design structure 1920 may be generated using electronic computer-aided design (ECAD) such as implemented by a core developer/designer. When encoded on a machine-readable data transmission, gate array, or storage medium, design structure 1920 may be accessed and processed by one or more hardware and/or software modules within design process 1910 to simulate or otherwise functionally represent an electronic component, circuit, electronic or logic module, apparatus, device, or system such as those shown herein. As such, design structure 1920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1910 preferably employs and incorporates hardware and/or software modules for synthesizing, translating, or otherwise processing a design/simulation functional equivalent of the components, circuits, devices, or logic structures shown herein to generate a netlist 1980 which may contain design structures such as design structure 1920. Netlist 1980 may comprise, for example, compiled or otherwise processed data structures representing a list of wires, discrete components, logic gates, control circuits, I/O devices, models, etc. that describes the connections to other elements and circuits in an integrated circuit design. Netlist 1980 may be synthesized using an iterative process in which netlist 1980 is resynthesized one or more times depending on design specifications and parameters for the device. As with other design structure types described herein, netlist 1980 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 1910 may include hardware and software modules for processing a variety of input data structure types including netlist 1980. Such data structure types may reside, for example, within library elements 1930 and include a set of commonly used elements, circuits, and devices, including models, layouts, and symbolic representations, for a given manufacturing technology (e.g., different technology nodes, 32 nm, 45 nm, 100 nm, etc.). The data structure types may further include design specifications 1940, characterization data 1950, verification data 1960, design rules 1990, and test data files 1985 which may include input test patterns, output test results, and other testing information. Design process 1910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1910 without deviating from the scope and spirit of the invention. Design process 1910 may also include modules for performing standard circuit design processes such as timing analysis, verification, design rule checking, place and route operations, etc.

Design process 1910 employs and incorporates logic and physical design tools such as HDL compilers and simulation model build tools to process design structure 1920 together with some or all of the depicted supporting data structures along with any additional mechanical design or data (if applicable), to generate a second design structure 1990. Design structure 1990 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 1920, design structure 1990 preferably comprises one or more files, data structures, or other computer-encoded data or instructions that reside on transmission or data storage media and that when processed by an ECAD system generate a logically or otherwise functionally equivalent form of one or more of the embodiments of the invention shown herein. In one embodiment, design structure 1990 may comprise a compiled, executable HDL simulation model that functionally simulates the devices shown herein.

Design structure 1990 may also employ a data format used for the exchange of layout data of integrated circuits and/or symbolic data format (e.g., information stored in a GDSII (GDS2), GL1, OASIS, map files, or any other suitable format for storing such design data structures). Design structure 1990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown herein. Design structure 1990 may then proceed to a stage 1995 where, for example, design structure 1990: proceeds to tape-out, is released to manufacturing, is released to a mask house, is sent to another design house, is sent back to the customer, etc.

As has been described, in at least one embodiment, a multiprocessor data processing system is configured to efficiently enforce ordering of a storage-modifying operation preceding a barrier with respect to an interrupt following the barrier. A processing unit of the multiprocessor data processing system includes a processor core including an upper level cache and a lower level cache coupled to the processor core. The lower level cache includes one or more state machines for handling requests snooped from the system interconnect. The processing unit includes an interrupt unit configured to, based on receipt of an interrupt request while the processor core is in a powered up state, record which of the one or more state machines are active processing a prior snooped request that can invalidate a cache line in the upper level cache and present an interrupt to the processor core based on determining that each state machine that was active processing a prior snooped request that can invalidate a cache line in the upper level cache has completed processing of its respective prior snooped request.

While various embodiments have been particularly shown and described, it will be understood by those skilled in the art that various changes in form and detail may be made therein without departing from the spirit and scope of the appended claims and these alternate implementations all fall within the scope of the appended claims.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although a particular embodiment of a memory hierarchy has been described in which L1 and L2 caches are incorporated within a processing unit, those skilled in the art will appreciate that a greater or lesser number of levels of cache hierarchy may be employed. Further, these levels of cache hierarchy may include in-line or lookaside caches and may include one or more levels of off-chip cache. Further, the level of cache hierarchy at which coherency is determined may differ from that discussed with reference to the described embodiments.

Further, although aspects have been described with respect to a computer system executing program code that directs the functions of the present invention, it should be understood that present invention may alternatively be implemented as a program product including a computer-readable storage device storing program code that can be processed by a data processing system. The computer-readable storage device can include volatile or non-volatile memory, an optical or magnetic disk, or the like. However, as employed herein, a "storage device" is specifically defined to include only statutory articles of manufacture and to exclude signal media per se, transitory propagating signals per se, and energy per se.

The program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A processing unit for a data processing system including a system interconnect and multiple processing units all having access to a shared memory, said processing unit comprising:
    a processor core including an upper level cache;
    a lower level cache coupled to the processor core, wherein the lower level cache includes one or more state machines for handling requests snooped from the system interconnect; and
    an interrupt unit configured to, based on receipt of an interrupt request while the processor core is in a powered up state, record which of the one or more state machines are active processing a prior snooped request that can invalidate a cache line in the upper level cache and present an interrupt to the processor core based on determining that each state machine that was active processing a prior snooped request that can invalidate a cache line in the upper level cache has completed processing of its respective prior snooped request.

2. The processing unit of claim 1, wherein the interrupt unit is further configured to, based on receipt of an interrupt request while the processor core is in a powered down state, power up the processor core and present an interrupt to the processor core.

3. The processing unit of claim 1, wherein the interrupt unit is further configured to be coupled to the system interconnect and to snoop the interrupt request from the system interconnect.

4. A data processing system, comprising:
    the multiple processing units including the processing unit of claim 1, wherein the processing unit is a first processing unit;
    the system interconnect communicatively coupling the shared memory and the multiple processing units; and
    an interrupt controller coupled to the system interconnect, wherein the interrupt controller is configured to issue the interrupt request based upon receipt of a request from a second processing unit among the multiple processing units.

5. The data processing system of claim 4, wherein the second processing unit is configured to issue the request to the interrupt controller based on execution of an explicit interrupt instruction.

6. The data processing system of claim 5, wherein the second processing unit executes the explicit interrupt instruction in an instruction sequence including a store instruction and a barrier instruction preceding the explicit interrupt instruction in program order.

7. A method of data processing in a processing unit of a data processing system including a system interconnect and multiple processing units all having access to a shared memory, said method comprising:
    executing instructions in a processor core of the processing unit and caching data for low latency access in an upper level cache in the processor core;
    caching data in a lower level cache coupled to the processor core;
    handling, in the lower level cache, requests snooped from the system interconnect utilizing one or more state machines; and
    based on receipt of an interrupt request while the processor core is in a powered up state, an interrupt unit of the processing unit recording which of the one or more state machines are active processing a prior snooped request that can invalidate a cache line in the upper level cache and presenting an interrupt to the processor core based on determining that each state machine that was active processing a prior snooped request that can invalidate a cache line in the upper level cache has completed processing of its respective prior snooped request.

8. The method of claim 7, and further comprising the interrupt unit, based on receipt of an interrupt request while the processor core is in a powered down state, powering up the processor core and presenting an interrupt to the processor core.

9. The method of claim 7, and further comprising the interrupt unit snooping the interrupt request from the system interconnect.

10. The method of claim 7, wherein:
the processing unit is a first processing unit; and
the method further comprises an interrupt controller issuing the interrupt request based upon receipt of a request from a second processing unit among the multiple processing units.

11. The method of claim 10, and further comprising the second processing unit issuing the request to the interrupt controller based on execution of an explicit interrupt instruction.

12. The method of claim 11, and further comprising:
the second processing unit executing the explicit interrupt instruction in an instruction sequence including a store instruction and a barrier instruction preceding the explicit interrupt instruction in program order.

13. A design structure tangibly embodied in a machine-readable storage device for designing, manufacturing, or testing an integrated circuit, the design structure comprising:
a processing unit for a data processing system including a system interconnect and multiple processing units all having access to a shared memory, said processing unit including:
a processor core including an upper level cache;
a lower level cache coupled to the processor core, wherein the lower level cache includes one or more state machines for handling requests snooped from the system interconnect; and
an interrupt unit configured to, based on receipt of an interrupt request while the processor core is in a powered up state, record which of the one or more state machines are active processing a prior snooped request that can invalidate a cache line in the upper level cache and present an interrupt to the processor core based on determining that each state machine that was active processing a prior snooped request that can invalidate a cache line in the upper level cache has completed processing of its respective prior snooped request.

14. The design structure of claim 13, wherein the interrupt unit is further configured to, based on receipt of an interrupt request while the processor core is in a powered down state, power up the processor core and present an interrupt to the processor core.

15. The design structure of claim 13, wherein the interrupt unit is further configured to be coupled to the system interconnect and to snoop the interrupt request from the system interconnect.

16. The design structure of claim 13, and further comprising:
the multiple processing units including the processing unit of claim 1, wherein the processing unit is a first processing unit;
the system interconnect communicatively coupling the shared memory and the multiple processing units; and
an interrupt controller coupled to the system interconnect, wherein the interrupt controller is configured to issue the interrupt request based upon receipt of a request from a second processing unit among the multiple processing units.

17. The design structure of claim 16, wherein the second processing unit is configured to issue the request to the interrupt controller based on execution of an explicit interrupt instruction.

18. The design structure of claim 17, wherein the second processing unit executes the explicit interrupt instruction in an instruction sequence including a store instruction and a barrier instruction preceding the explicit interrupt instruction in program order.

* * * * *